US012522385B2

(12) United States Patent
Hofreither et al.

(10) Patent No.: US 12,522,385 B2
(45) Date of Patent: Jan. 13, 2026

(54) AIRCRAFT

(71) Applicant: CYCLOTECH GMBH, Linz (AT)

(72) Inventors: Klemens Hofreither, St. Valentin (AT); Lukas Kinast, Linz (AT)

(73) Assignee: CYCLOTECH GMBH, Linz (AT)

( * ) Notice: Subject to any disclaimer, the term of this patent is extended or adjusted under 35 U.S.C. 154(b) by 43 days.

(21) Appl. No.: 18/514,505

(22) PCT Filed: May 23, 2022

(86) PCT No.: PCT/EP2022/063841
§ 371 (c)(1),
(2) Date: Nov. 20, 2023

(87) PCT Pub. No.: WO2022/243559
PCT Pub. Date: Nov. 24, 2022

(65) Prior Publication Data
US 2025/0121937 A1    Apr. 17, 2025

(51) Int. Cl.
*B64U 30/20*    (2023.01)
*B64C 39/00*    (2023.01)

(52) U.S. Cl.
CPC ............ *B64U 30/20* (2023.01); *B64C 39/005* (2013.01)

(58) Field of Classification Search
CPC ... B64C 39/003; B64C 39/0015; B64C 17/02; B64C 39/005
See application file for complete search history.

(56) References Cited

U.S. PATENT DOCUMENTS 1,754,977 A * 4/1930 Bergman .............. B64C 39/005
244/20
3,354,566 A    11/1967 Steucke
(Continued)

FOREIGN PATENT DOCUMENTS

CN    106828886 A    6/2017
CN    211642580 U * 10/2020
(Continued)

OTHER PUBLICATIONS

Screen captures from YouTube Video clip entitled "CycloTech / CycloRotor / Cyclogyro Principle", 1 page, uploaded on Jan. 23, 2020 by user "CycloTech GmbH". Retrieved from Internet: <https://www.youtube.com/watch?v=mC4VrE3Tlnl>. (Year: 2020).*
(Continued)

*Primary Examiner* — Philip J Bonzell
*Assistant Examiner* — Anna L. Gordon
(74) *Attorney, Agent, or Firm* — Kinney & Lange, P.A.

(57) ABSTRACT

An aircraft includes an aircraft body defining a longitudinal direction, a vertical direction and a transverse direction, and at least two propulsion devices rotatable about a respective associated axis of rotation to generate a respective associated thrust vector, wherein a first number of propulsion devices are arranged along a first straight line, which is parallel to the transverse direction, and a second number of propulsion devices are arranged along a second straight line which is parallel to the transverse direction, the first straight line being spaced apart from the second straight line, and the center of mass of the aircraft being positioned between the first straight line and the second straight line.

19 Claims, 12 Drawing Sheets

(56) References Cited

U.S. PATENT DOCUMENTS

| | | | |
|---|---|---|---|
| 7,654,486 B2* | 2/2010 | Milde, Jr. | B64C 29/0025 |
| | | | 244/12.3 |
| 9,346,535 B1 | 5/2016 | Adams | |
| 10,384,776 B2 | 8/2019 | Choi et al. | |
| 2018/0044013 A1* | 2/2018 | Groninga | B64C 3/32 |
| 2018/0057160 A1* | 3/2018 | Robertson | B64C 25/32 |
| 2018/0237136 A1 | 8/2018 | Choi et al. | |
| 2019/0061925 A1* | 2/2019 | Groninga | B64D 27/02 |
| 2019/0071174 A1 | 3/2019 | Burigo et al. | |
| 2019/0337616 A1 | 11/2019 | Benedict et al. | |
| 2020/0086984 A1 | 3/2020 | Legrand et al. | |
| 2020/0108920 A1* | 4/2020 | Rivellini | B64U 10/13 |
| 2020/0277054 A1* | 9/2020 | Lee | B64D 45/00 |
| 2021/0300527 A1* | 9/2021 | Thalheimer | B64C 29/0033 |
| 2022/0234729 A1* | 7/2022 | Habibnia Rami | B64C 15/12 |

FOREIGN PATENT DOCUMENTS

| | | |
|---|---|---|
| EP | 3354566 A1 | 8/2018 |
| EP | 3594113 A1 | 1/2020 |
| JP | 2019500269 A | 1/2019 |
| JP | 2021506650 A | 2/2021 |
| KR | 100810725 B1 | 3/2008 |

OTHER PUBLICATIONS

Screen captures from YouTube Video clip entitled "Bladeless Drone: First Flight", 2 pages, uploaded on Oct. 14, 2018 by user "Stefano Rivellini". Retrieved from Internet: <https://www.youtube.com/watch?v=5L6FSdUmEpg>. (Year: 2018).*

Development of a Cross-Flow Fan Powered Quad-Rotor Unmanned Aerial Vehicle [online] Naval Postgraduate School, Jun. 2015 [retrieved on Aug. 30, 2025]. Retrieved from the Internet: <https://apps.dtic.mil/sti/tr/pdf/ADA632493.pdf> (Year: 2015).*

Extended European Search Report for EP Application No. 21175290.2, dated Nov. 19, 2021, 24 pages.

International Search Report and Written Opinion from PCT Application Serial No. PCT/EP2022/063841, dated Sep. 15, 2022, 24 pages.

Extended European Search Report for EP Application No. 21175290.2, Dated Nov. 19, 2021, pp. 47.

First Japanese Office Action for JP Application No. 2023-570206, Dated Oct. 31, 2024, pp. 18.

* cited by examiner

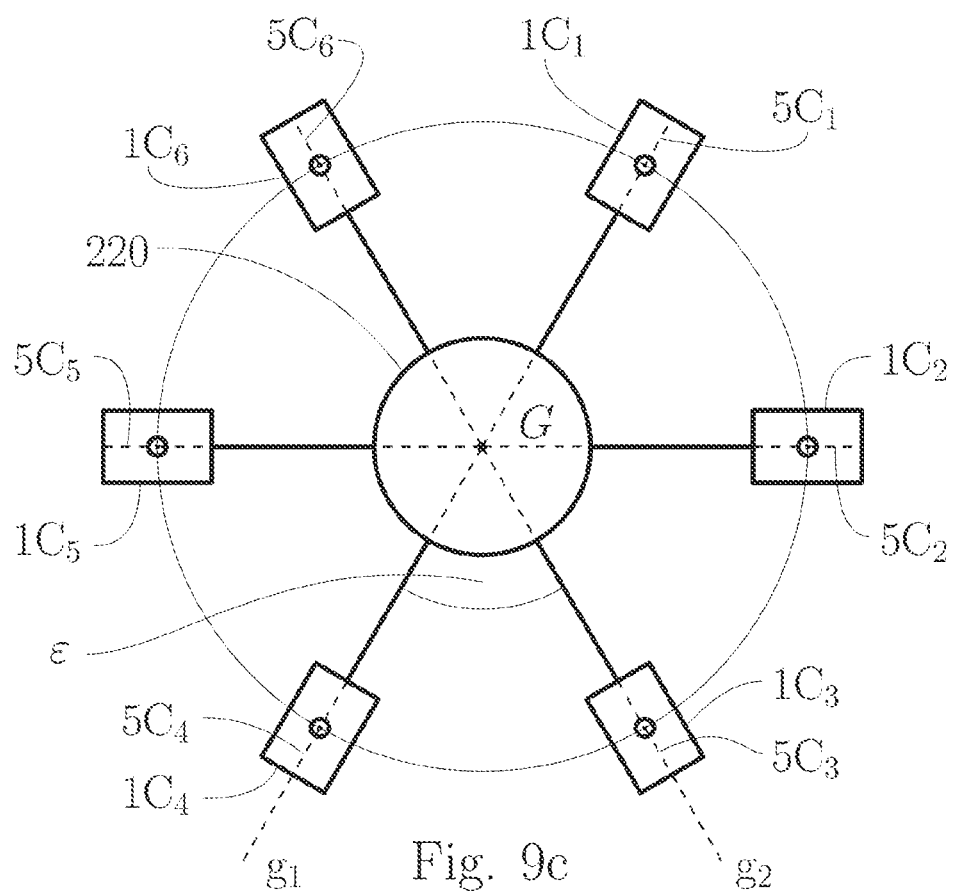

AIRCRAFT

CROSS-REFERENCE TO RELATED APPLICATION(S)

This application is a national stage entry of PCT/EP2022/063841 under 35 U.S.C. § 371, filed May 23, 2022, which claims priority to European application EP21175290.2, which was filed on May 21, 2021, the entire content of which are incorporated herein by reference in their entirety.

BACKGROUND

The invention relates to an aircraft and methods for manufacturing and controlling the aircraft. In particular, the invention relates to an aircraft capable of performing a stable hovering flight with propulsion devices, in particular cyclogyro rotors, rotating in the same direction.

SUMMARY

An aircraft includes an aircraft body defining a longitudinal direction, a vertical direction, and a transverse direction, the longitudinal direction corresponding to the direction from the tail to the nose of the aircraft, the vertical direction corresponding to the direction of the earth's gravitational force when the aircraft is resting on the ground, and the transverse direction being perpendicular to the longitudinal direction and the vertical direction, and at least two propulsion devices, each rotatable about an associated axis of rotation to generate a respective associated thrust vector. A first number of the propulsion devices is arranged along a first straight line parallel to the transverse direction, and a second number of the propulsion devices is arranged along a second straight line parallel to the transverse direction, the first straight line is spaced apart from the second straight line, and the center of mass of the aircraft is positioned with respect to the longitudinal direction between the first straight line and the second straight line. The aircraft is adapted to perform a hover flight in which all forces acting on the aircraft and all torques acting on the aircraft with respect to the center of mass of the aircraft substantially disappear, characterized in that in the hover flight each of the associated axes of rotation is oriented substantially in the transverse direction of the aircraft body, and each of the at least two propulsion devices rotates substantially in the same direction of rotation about the respective associated axis of rotation.

An aircraft includes an aircraft fuselage and at least three propulsion devices mounted around the aircraft fuselage and rotatable about a respective associated axis of rotation to generate a respective associated thrust vector. The aircraft is adapted to perform a hover flight in which all forces acting on the aircraft and all torques acting on the aircraft with respect to the center of mass of the aircraft substantially disappear, characterized in that in the hover flight, the associated axes of rotation of two of the at least three propulsion devices are substantially aligned in a first direction, and the associated axis of rotation of another of the at least three propulsion devices is substantially aligned in a second direction. The first direction is not parallel to the second direction, and each of the two propulsion devices with axes of rotation oriented in the first direction in hover flight rotates in substantially the same direction of rotation about the respective associated axis of rotation.

A method for controlling an aircraft having an aircraft body defining a longitudinal direction, a vertical direction, and a transverse direction, the longitudinal direction corresponding to the direction from the tail to the nose of the aircraft, the vertical direction corresponding to the direction of the earth's gravitational force when the aircraft is resting on the ground, and the transverse direction being perpendicular to the longitudinal direction and the vertical direction, and at least two propulsion devices rotatable about a respective associated axis of rotation to generate a respective associated thrust vector. A first number of the propulsion devices is arranged along a first straight line parallel to the transverse direction, and a second number of the propulsion devices is arranged along a second straight line parallel to the transverse direction, the first straight line is spaced apart from the second straight line, and the center of mass of the aircraft is positioned with respect to the longitudinal direction between the first straight line and the second straight line. The method includes the steps of determining the associated thrust vectors such that the aircraft performs a hover flight when each of the axes of rotation associated with the at least two propulsion devices is oriented substantially in the transverse direction of the aircraft body, and each of the at least two propulsion devices rotates substantially in the same direction of rotation about the respective associated axis of rotation such that in hover flight all forces acting on the aircraft and all torques acting on the aircraft with respect to the center of mass of the aircraft substantially disappear. The steps further include driving each of the propulsion devices in substantially the same direction of rotation such that the respective propulsion device generates the particular associated thrust vector.

A method for controlling an aircraft having an aircraft fuselage and at least three propulsion devices mounted around the aircraft fuselage and rotatable about a respective associated axis of rotation to generate a respective associated thrust vector includes the following steps: determining the associated thrust vectors such that the aircraft performs a hover flight when two of the rotational axes associated with the at least three propulsion devices are substantially aligned in a first direction and rotate substantially in the same rotational direction about the respective associated rotational axis, and/or another of the rotational axes associated with the at least three propulsion devices is substantially aligned in a second direction that is not parallel to the first direction, wherein in hover flight all forces acting on the aircraft and all torques acting on the aircraft with respect to the center of mass of the aircraft substantially disappear, aligning the associated axes of rotation of two of the at least three propulsion devices substantially in the first direction, and aligning the associated axis of rotation of the one other of the at least three propulsion devices substantially in the second direction, and driving each of the propulsion devices such that the respective propulsion device rotates in an associated rotational direction and generates the particular associated thrust vector. Each of the two propulsion devices has axes of rotation oriented substantially in the first direction rotates substantially in the same direction of rotation about the respective associated axis of rotation.

BRIEF DESCRIPTION OF THE DRAWINGS

Preferred embodiments of the present invention are described below with reference to the following figures.

FIG. 9c is a schematic representation of an aircraft according to the second aspect of the invention with six propulsion devices.

DETAILED DESCRIPTION

Figure 1:
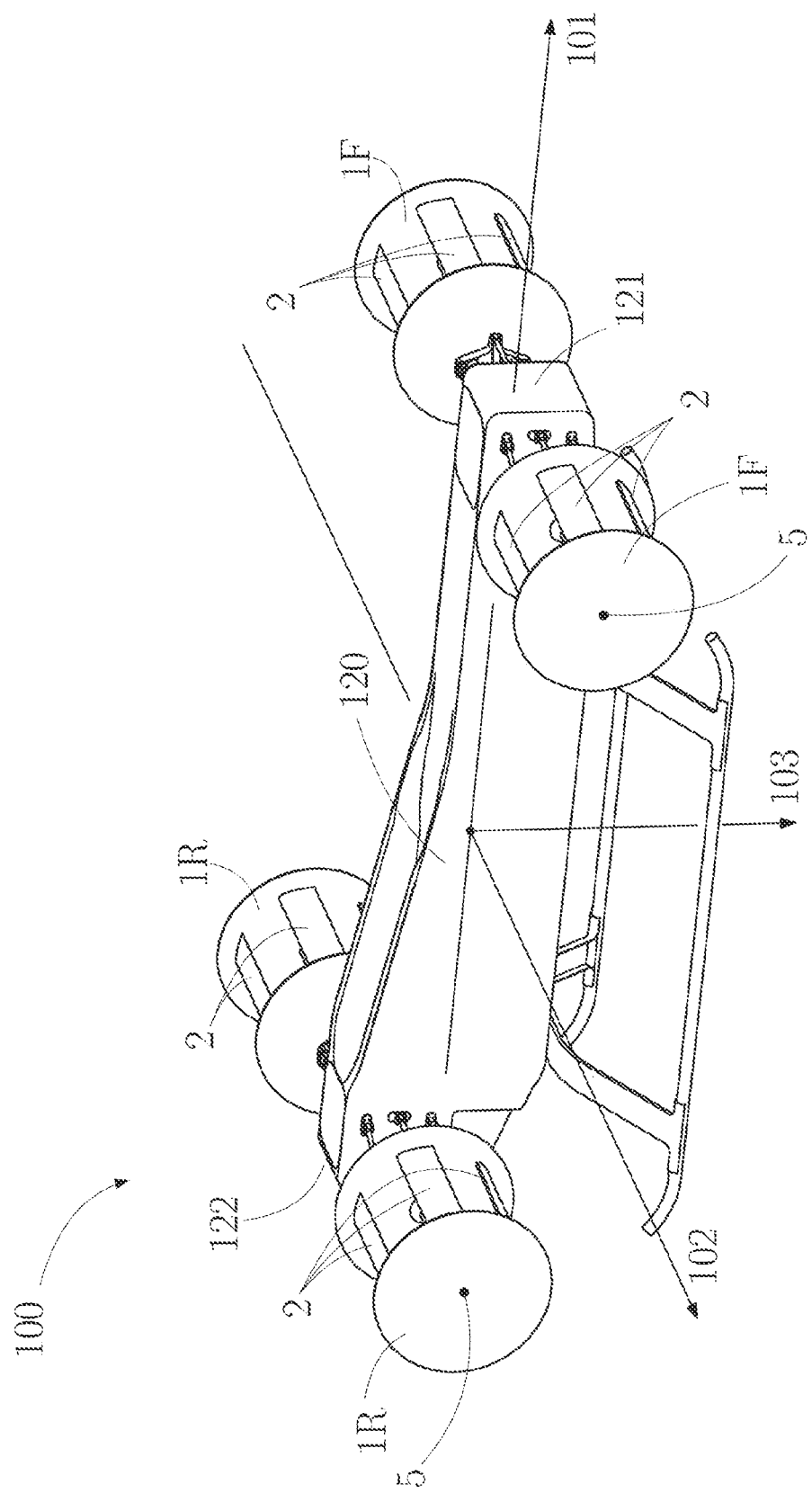
FIG. 1 is a perspective view of an aircraft according to the first aspect of the invention.

Aircrafts that use cyclogyro rotors as propulsion devices are called cyclogyros. Like helicopters, cyclogyros are also vertical take-off and landing (VTOL) vehicles, i.e. aircrafts capable of taking off and landing vertically without a runway.

A cyclogyro rotor is based on the principle of thrust generation with rotating blades, which are then called rotor blades. In contrast to classical rotating blades, such as those used in the propulsion system of a helicopter, the axis of rotation of the blades of a cyclogyro rotor is aligned parallel to the longitudinal axis of the blades/rotor blades. The thrust direction of the entire cyclogyro rotor is perpendicular to the axis of rotation.

In stationary operation, such as hovering flight or forward flight at constant speed, all rotor blades of the cyclogyro rotor should ideally be oriented as best as possible with respect to the direction of flow at all times, in order to make a maximum contribution to the total thrust in each case with minimum required propulsion power. The maximum pitch of the rotor blades relative to the direction of flow directly affects the magnitude of thrust generated. As the rotor rotates, the pitch of each rotor blade must be continuously changed during one revolution. Each rotor blade of a cyclogyro rotor thus performs a periodic change of pitch angle. This periodic change of the pitch angle is called pitch motion.

Different pitch mechanisms are known for generating the pitch motion. For example, each rotor blade can be connected to an eccentric bearing axis via one or more connecting rods. The resulting pitch motion of a rotor blade is repeated cyclically with each rotor revolution.

Various embodiments of propulsion devices for cyclogyros are described, for example, in the European patent applications published under Nos. EP 3548378 A1 and EP 3715249 A1.

The periodic adjustment of the rotor blades generates a thrust vector perpendicular to the axis of rotation of the rotor. An offset device is used to change the periodic rotor blade pitch, and thus the thrust vector can be rotated in the entire plane perpendicular to the axis of rotation of the rotor (thrust vector control). In addition to the thrust vector, the rotor generates a torque about the axis of rotation against the direction of rotation of the rotor resulting from the tangential components of the air forces acting on the rotor blades, namely the lift and drag forces.

If air flows against the rotor from the outside, the aerodynamic properties and thus the properties of the generated thrust vector change. If the rotor is in forward flight, air is actively blown at it from the front. The changed properties can be approximately explained by the Magnus effect. This states: "A rotating round body in a flow experiences a transverse force perpendicular to the direction of flow."

The direction of the transverse force depends on the direction of rotation of the body or here: of the cyclogyro rotor.

However, in aircraft or cyclogyros known from, for example, the article by I. S. Hwang et al: "Development of a Four-Rotor Cyclocopter" from Journal of Aircraft, Vol. 45, No. 6, November-December 2008, pages 2151 ff. and the article by M. Benedict et al: "Experimental Optimization of MAV-Scale Cycloidal Rotor Performance" from Journal of the American Helicopter Society 56, 022005 (2011), rotors rotate in opposite directions while the incident flow remains constant. In this case, i.e., when the rotors rotate in opposite directions, the transverse forces of the rotors caused by the Magnus effect do not act in the same direction and thus may reduce the total thrust or increase the power requirement while the same lift force is required. At higher forward speeds and opposite direction of rotation, it is thus possible that the negative effect of the Magnus effect can no longer be compensated by the rotor. As a result, the aircraft is no longer able to fly and the rotor cannot be used as a lift-generating component.

It is therefore the object of the present invention to provide an aircraft capable of assuming a stable flight attitude in forward flight even at high speeds.

In accordance with a first aspect of the invention, there is provided an aircraft comprising: an aircraft body defining a longitudinal direction, a vertical direction, and a transverse direction, the longitudinal direction corresponding to the direction from the tail to the nose of the aircraft, the vertical direction corresponding to the direction of the earth's gravitational force when the aircraft is resting on the ground, and the transverse direction being perpendicular to the longitudinal direction and the vertical direction; and at least two propulsion devices rotatable about a respective axis of rotation to generate a respective thrust vector. A first number of propulsion devices are arranged along a first straight line that is parallel to the transverse direction, and a second number of the propulsion devices are arranged along a second straight line that is parallel to the transverse direction. The first straight line is spaced apart from the second straight line, and the center of mass of the aircraft is positioned with respect to the longitudinal direction between the first straight line and the second straight line. The aircraft is thereby adapted to perform a hover flight in which all forces acting on the aircraft and all torques acting on the aircraft with respect to the center of mass of the aircraft substantially disappear, in that in the hover flight each of the associated axes of rotation is oriented substantially in the transverse direction of the aircraft body, and each of the at least two propulsion devices rotates substantially in the same direction of rotation about the respective associated axis of rotation.

According to the invention, an axis of rotation is oriented substantially in the transverse direction of the aircraft body if the angle included between the axis of rotation, and an axis extending in the transverse direction and intersecting the axis of rotation, is less than 45°, preferably less than 30°, more preferably less than 15°.

Thus, for the purposes of the invention, it is not necessary for all axes of rotation to be mathematically exactly parallel in hover flight. In fact, it may be convenient if the angle between a rotational axis and an axis running in the transverse direction and intersecting the rotational axis is in the range between 5° and 30°, particularly preferably, between 10° and 20°.

Furthermore, according to the invention, the propulsion devices rotate essentially in the same direction of rotation if the scalar product of the vector of the angular velocity of a certain propulsion device and a fixed but arbitrary vector pointing in the transverse direction has the same sign for all propulsion devices. This means that in order to check that all the propulsion devices under consideration, or each of the propulsion devices under consideration, rotate in essentially the same direction of rotation, a vector in the transverse direction is first fixed. Then, for a first propulsion device, the scalar product of its angular velocity vector and the fixed vector is calculated; then, for a second propulsion device, the scalar product of its angular velocity vector and the fixed vector is calculated; and so on. Finally, only the signs (plus or minus) of the scalar products calculated in this way are compared. If all signs are the same, the propulsion devices under consideration or each of the propulsion devices under consideration rotate essentially in the same direction of rotation in the sense of the invention.

For the purposes of the invention, therefore, it is not necessary for all axes of rotation to be mathematically exactly parallel in hover flight, nor is it necessary for all propulsion devices to rotate about the axis of rotation at the same rotational or (in terms of magnitude) angular velocity.

By designing the aircraft to perform hover flight with the propulsion devices rotating in substantially the same direction, a reduction in the power consumption of the propulsion devices is achieved. In simple terms, the Magnus effect that occurs according to the invention replaces some of the thrust of the propulsion devices and thus reduces the power requirement in forward flight compared to hover flight. Because more residual power is thus left for the propulsion devices in forward flight, the agility of the aircraft in forward flight in particular is increased.

The Magnus effect states that a rotating round body in a flow experiences a transverse force perpendicular to the direction of flow. In the case of the propulsion devices according to the invention, which rotate in essentially the same direction, this effect can generate an additional thrust vector or force in the vertical direction. Thus, the total lift force of the propulsion devices is increased. The Magnus effect replaces part of the thrust force to be applied by the propulsion device and thus reduces the power requirement in forward flight compared to hover flight. Now, when the rotor is in forward flight, air is actively flowing to it from the front. In the configuration according to the invention, with the propulsion devices rotating in essentially the same direction, the additional transverse force of the Magnus effect acts in essentially the same direction as the thrust force of the propulsion devices while the inflow remains constant, thus increasing the total thrust force or reducing the power requirement while the same lift force is required. Thus, in forward flight, particularly at higher forward speeds and substantially the same direction of rotation, it is possible that the positive effect of the Magnus effect may require lower power and/or rotational speed from the propulsion devices to maintain the aircraft in a stable flight attitude.

In a particularly preferred embodiment, the aircraft is further adapted such that, in hover flight, the center of mass of the aircraft is positioned so as to thereby cause all forces acting on the aircraft and all torques acting on the aircraft with respect to the center of mass of the aircraft to substantially disappear when one or more of the propulsion devices generate a particular predetermined thrust vector associated therewith. Associated with this instruction is the constraint that the center of mass of the aircraft with respect to the longitudinal direction must be within a range determined by the aircraft being capable of hovering when one or more of the propulsion devices are driven at maximum thrust or maximum thrust vector. In other words, if the center of mass is within said range, the propulsion devices are capable of generating appropriate thrust vectors to enable the aircraft to perform hovering flight.

In hover flight, the approach velocity is basically lower than in forward flight. The fact that the thrust vectors of the propulsion devices for hovering flight are specified for the aircraft according to the invention, and the position of the center of mass for hovering flight is determined, ensures that a stable flight attitude is also possible in forward flight. As stated above, the greater the approach velocity, the greater the positive effect produced by the Magnus effect according to the invention. Therefore, the configuration of the aircraft in hover flight according to the invention ensures that the aircraft can assume a stable flight attitude, particularly in forward flight, because in forward flight the Magnus effect leads to a greater increase in the thrust vector than in the case of hover flight.

When designing and configuring an aircraft with propulsion devices according to the invention, all forces and torques of the propulsion devices must be taken into account. Basically, the thrust force or thrust vector is used to generate the required lift force and/or to control the flight attitude of the aircraft. For this purpose, the aircraft conveniently comprises a thrust vector control system that regulates the required thrust force or required thrust vectors in hover flight and/or in forward flight.

Each of the propulsion devices according to the invention generates a torque against the direction of rotation. This torque about the axis of rotation against the direction of rotation of the propulsion device results from, among other things, tangential air forces caused by air resistance. In order to maintain a constant rotational speed, the propulsion device must thus generate a (drive-) torque that counteracts the torque resulting due to the tangential air forces. However, in order for the propulsion device to be able to generate such a (propulsion) torque also during the flight phase, another torque is required, which the aircraft body must apply (according to the principle of actio=reactio) in order to "support" the propulsion device in the air. This latter torque, in order to maintain a constant rotational speed against the air forces, is (neglecting dissipative effects) approximately equal in magnitude to the torque generated by the tangential air forces, and also points in the same direction as the latter. Since the torque generated by the air forces opposes the direction of rotation of the propulsion device, the torque applied by the aircraft body also opposes the direction of rotation of the propulsion device. Assuming that the torque due to the air forces and that due to the propulsion device are substantially equal in magnitude but oppositely directed, the net torque remaining due to the rotation of the propulsion device is the torque applied by the aircraft body.

According to the invention, this torque or these torques are compensated by positioning the center of mass of the aircraft in such a way that, taking into account the thrust vectors assigned to the respective propulsion devices, all forces acting on the aircraft and all torques acting on the aircraft with respect to the center of mass of the aircraft essentially disappear during hovering flight.

Since, according to the invention, the propulsion devices rotate in essentially the same direction, the torques of all these propulsion devices, caused by the aircraft body, described above also act in essentially the same direction. The torques therefore add up and do not cancel each other out.

In order to be able to achieve a stable flight attitude in hovering flight as well as in forward flight, the balance of all forces and torques acting on the aircraft must be fulfilled. The calculation is performed using the momentum theorem and the relationship between angular momentum and torque.

The momentum theorem reads:

$$m\ddot{r}_s = F,$$

where m the mass of the aircraft, $\ddot{r}_s$ the acceleration vector of the center of mass of the aircraft, and F corresponds to the force vector acting on the aircraft.

The relationship between angular momentum and torque states $$\dot{L}_s = M_s$$

where $\dot{L}_s$ is the temporal change of the angular momentum vector (spin vector) and $M_s$ is the torque vector acting on the aircraft.

With the requirement for a stable flight attitude (hovering flight, uniform speed in forward flight, etc.), the acceleration vector $\ddot{r}_s$ and the temporal change of the angular momentum vector $\dot{L}_s$ must be zero. Thus, both the sum of all external forces (F) as well as the sum of all torques around the center of mass ($M_s$) must add up to zero, respectively. The forces acting on the aircraft in hover flight are gravity and the thrust forces of the propulsion devices. The torques acting with respect to the center of mass of the aircraft are the torques generated by the thrust vectors of the propulsion devices supported at associated distances from the center of mass of the aircraft, and the (support) torques generated by the aircraft body, all pointing in substantially the same direction.

The balance of forces and torques can thus be achieved by selecting the thrust forces or thrust vectors of the propulsion devices and their distances from the center of mass of the aircraft accordingly.

Preferably, the first number of propulsion devices is disposed in a forward region of the aircraft with respect to the longitudinal direction, and the second number of propulsion devices is disposed in a rearward region of the aircraft with respect to the longitudinal direction. Preferably, the aircraft comprises three propulsion devices. Particularly preferably, the aircraft comprises four propulsion devices, wherein two of the propulsion devices are arranged in a forward region of the aircraft with respect to the longitudinal direction, and two other propulsion devices are arranged in a rearward region of the aircraft with respect to the longitudinal direction. The overall length of the aircraft is measured in the longitudinal direction. For simpler description of regions of the aircraft, the frontmost part of the aircraft is hereafter assigned the relative longitudinal coordinate 0, and the rearmost part of the aircraft is assigned the relative longitudinal coordinate 100%. In this convention, the foremost portion is determined to correspond to the (longitudinal) range of 0 to 40% of the total length of the aircraft, and the rearmost portion is determined to correspond to the (longitudinal) range of 60% to 100% of the total length of the aircraft. Further, it is convenient if the two propulsion devices located in the forward region are on a common straight line oriented parallel to the transverse direction. It is also expedient if the two propulsion devices arranged in the rear area lie on a common straight line which is aligned parallel to the transverse direction.

Advantageously, the propulsion devices in the forward area are arranged along the first straight line running parallel to the transverse direction, and the propulsion devices in the rear area are arranged along the second straight line running parallel to the transverse direction. Thereby, the center of mass of the aircraft, when performing hovering flight, is positioned in the longitudinal direction at a distance $l_1$ from the straight line along which the propulsion devices are arranged in the forward region, wherein $$l_{1_{min}} \le l_1 \le l_{1_{max}},$$

with $$l_{1_{min}} = \frac{a_1 + a_2}{2} + \frac{l}{R_{max} + 1} \text{ and } l_{1_{max}} = \frac{a_1 + a_2}{2} + \frac{l}{R_{min} + 1},$$

wherein
  $R_{min}$ is a minimum permissible ratio between the thrust vectors of the propulsion devices arranged in the front area, on the one hand, and the thrust vectors of the propulsion devices arranged in the rear area, on the other hand,
  $R_{max}$ is a maximum permissible ratio between the thrust vectors of the propulsion devices arranged in the front area, on the one hand, and the thrust vectors of the propulsion devices arranged in the rear area, on the other hand,
  l is the distance between the first straight line and the second straight line,
  $a_1$ is a characteristic number for the propulsion devices located in the front area, and $a_2$ is a characteristic number for the propulsion devices located in the rear area.

Preferably, the aircraft is further designed to have the associated axes of rotation aligned in parallel during hover flight.

Finally, it should be noted that, according to the invention, it is not excluded that the aircraft comprises, in addition to the at least two propulsion devices contributing to the effect according to the invention, other propulsion devices which do not rotate substantially in the same direction of rotation.

In accordance with a second aspect of the invention, there is provided an aircraft comprising an aircraft fuselage, and at least three propulsion devices mounted about the aircraft fuselage and rotatable about respective associated axes of rotation to generate respective associated thrust vectors. The aircraft is thereby adapted to perform a hover flight in which all forces acting on the aircraft and all torques acting on the aircraft with respect to the center of mass of the aircraft substantially disappear, in that in the hover flight the associated axes of rotation of two of the at least three propulsion devices are substantially aligned in a first direction and the associated rotational axis of another of the at least three propulsion devices is oriented substantially in a second direction, the first direction being non-parallel to the second direction, and each of the two propulsion devices with rotational axes oriented in the first direction in hover flight rotates substantially in the same rotational direction about the respective associated rotational axis.

For the understanding of the terms "substantially aligned in a first/second direction" and "rotating substantially in the same direction" according to the invention, reference is made to the first aspect of the invention; the definitions given therein apply accordingly to the second aspect.

The first direction is not parallel to the second direction if a (reference) axis pointing in the first direction is not parallel to a (reference) axis pointing in the second direction. Preferably, the angle between the first and second directions is in the range of 30° to 110°, preferably in the range of 40° to 100°, more preferably in the range of 60° to 95°.

Preferably, the at least three propulsion devices are mounted around the aircraft fuselage substantially in a plane. Preferably, the aircraft fuselage lies in the plane, i.e., the plane intersects the aircraft fuselage. Further, it is advantageous if the first direction and the second direction lie in the plane.

Here, "mounted substantially in a plane" means that the propulsion devices or their mounting points do not have to be contained exactly in the same way in a plane. Thus, it is still in accordance with the invention if one or more of the propulsion devices are pivoted out of plane, and/or the propulsion devices are vertically offset with respect to the plane. Expediently, the vertical offset is constrained by the vertical extent of the aircraft fuselage, i.e., expediently, the propulsion devices are mounted such that the axes of rotation of the propulsion devices are contained within the region of space formed between two horizontal planes that contact the aircraft fuselage and are spaced apart by the vertical extent of the aircraft fuselage. The vertical extent is related to the direction of gravity when the aircraft is resting on the (flat) ground.

Preferably, each of the axes of rotation of the two of the at least three propulsion devices oriented substantially in the first direction is oriented such that it is substantially parallel to a straight line passing through the two propulsion devices. It is convenient if the straight line is laid through the geometric centers (the term will be explained further below) or bearing points of the propulsion devices.

According to the invention, an axis of rotation is substantially parallel to a straight line if the angle included between the axis of rotation and the straight line is less than 45°, preferably less than 30°, more preferably less than 15°.

Particularly preferably, the aircraft according to the second aspect of the invention comprises at least four propulsion devices mounted about the aircraft fuselage and rotatable about a respective associated axis of rotation to generate a respective associated thrust vector. The aircraft is thereby adapted to perform hovering flight, in that in hovering flight the associated rotational axes of two of the at least four propulsion devices are oriented substantially in the first direction, and the associated rotational axes of another two of the at least four propulsion devices are oriented substantially in the second direction, wherein each of the two propulsion devices having axes of rotation oriented in the first direction in hover flight rotates substantially in the same direction of rotation about the respective associated axis of rotation, and/or each of the two propulsion devices having axes of rotation oriented in the second direction in hover flight rotates substantially in the same direction about the respective associated axis of rotation.

The advantages which the aircraft according to the second aspect of the invention brings with it in comparison with the prior art correspond in principle to those already described in connection with the aircraft of the first aspect of the invention; in order to avoid repetition, reference is therefore first made to the explanations there, in particular with regard to the exploitation of the positive contribution of the Magnus effect in the case of propulsion devices rotating in the same direction. In connection with the latter contributions of the Magnus effect, it must be taken into account with the—in the following also referred to as "star-shaped"—arrangement of the propulsion devices around the aircraft fuselage that in forward flight, as a rule, only a part of the propulsion devices is flowed against by air in the direction of flight. Thus, the Magnus effect in forward flight, due to essentially equal rotational rotation, is strongest for those propulsion devices whose axes of rotation are oriented essentially perpendicular to the direction of flight. That is, in the arrangement of the propulsion devices according to the second aspect of the invention, it is sufficient if the aircraft is configured such that, in hover flight, each of the two propulsion devices with axes of rotation oriented in the first direction in hover flight rotates substantially in the same direction of rotation about the respective associated axis of rotation, or, in the case of at least four propulsion devices, each of the two propulsion devices with axes of rotation oriented in the second direction in hover flight rotates substantially in the same direction of rotation about the respective associated axis of rotation. In this case, it is possible that the two propulsion devices that do not rotate in substantially the same direction rotate in opposite directions. If these two propulsion devices rotate in opposite directions, the torque directly cancels each other out. However, it is particularly advantageous that when the aircraft includes at least four propulsion devices, the aircraft is configured such that, in hover flight, each of the two propulsion devices with axes of rotation oriented in the first direction in hover flight rotates in substantially the same direction of rotation about its respective associated axis of rotation, and each of the two propulsion devices with axes of rotation oriented in the second direction in hover flight rotates in substantially the same direction of rotation about its respective associated axis of rotation. This can ensure that the aircraft can take advantage of the positive effect of the Magnus effect during forward flight in both the first direction and the second direction. The aircraft is thus more flexible and stable during changes in flight direction.

In a particularly preferred embodiment, the aircraft is further adapted such that, in hover flight, the center of mass of the aircraft is positioned so as to thereby cause all forces acting on the aircraft and all torques acting on the aircraft with respect to the center of mass of the aircraft to substantially disappear when one or more of the propulsion devices generate a particular predetermined thrust vector associated therewith. Associated with this instruction is the constraint that the center of mass of the aircraft must be within a range determined by the aircraft being able to hover when one or more of the propulsion devices are driven at maximum thrust or maximum thrust vector. In other words, if the center of mass is within said range, the propulsion devices are capable of generating appropriate thrust vectors to enable the aircraft to perform hover flight.

Preferably, each of the axes of rotation of the two of the at least four propulsion devices oriented substantially in the first direction is oriented such that it is substantially parallel to a straight line passing through the two propulsion devices. It is also preferable if each of the axes of rotation of the two further of the at least four propulsion devices oriented substantially in the second direction is oriented such that it is substantially parallel to a straight line passing through said two further propulsion devices. It is preferable if the straight lines are laid through the geometric centers or bearing points of the propulsion devices.

As in the first aspect of the invention, the compensation of the torque or torques generated by the propulsion devices rotating substantially in the same direction is performed according to the invention by positioning the center of mass of the aircraft in such a way that, taking into account the thrust vectors respectively associated with and predetermined for the propulsion devices, all forces acting on the aircraft and all torques acting on the aircraft with respect to the center of mass of the aircraft substantially disappear in hover flight. In order to be able to achieve a stable flight attitude in hover flight as well as in forward flight, the equilibrium of all forces and torques acting on the aircraft must be fulfilled. The calculation is made by means of momentum theorem and the angular momentum torque relationship, which have already been given and described in connection with the first aspect of the invention. The statements made there apply here accordingly, and this will be further explained below.

It is advantageous if three propulsion devices are arranged around the aircraft fuselage in such a way that they form the edges of a triangle, preferably an equilateral triangle. It is convenient that the aircraft fuselage is located in the geometric center of the triangle. The first direction is defined by a straight line on which two of the three propulsion devices lie; the second direction is substantially perpendicular to the first direction. Moreover, the axis of rotation of each of the two propulsion devices lying on the straight line pointing in the first direction includes with said straight line an angle which is in the range between 0° and 45°, expediently between 0° and 30°. The geometric center corresponds to the averaging of all points within the triangle (i.e., the averaging over the area of the triangle with constant density). If the angle between the axis(es) of rotation and the straight line pointing in the first direction is chosen to be 30°, then the axis(es) of rotation of the propulsion devices point towards (or away from) the geometric center. However, the angle can also be chosen differently for each of the propulsion devices.

It is convenient if the straight line is placed through the geometric centers or bearing points of the propulsion devices.

It is advantageous if n propulsion devices are arranged around the aircraft fuselage in such a way that they form the edges of a polygon with n edges, n>3, expediently the edges of a regular polygon with n edges, n>3. Expediently, the aircraft fuselage is located in the geometric center of the polygon with n edges. Here, the first direction is defined by a first straight line on which two of the n propulsion devices lie; the second direction is defined by a second straight line on which two more of the n propulsion devices lie. The axis of rotation of each of the two propulsion devices lying on the first straight line pointing in the first direction includes an angle with the first straight line which lies in the range between 0° and 45°, expediently between 0° and 30°, expediently in the range between 0° and 20°, particularly preferably in the range between 0° and 18°. The rotary axes of different propulsion devices can thereby include different angles with the first straight line.

It is also expedient if the axis of rotation of each of the two propulsion devices lying on the second straight line pointing in the second direction encloses an angle with the second straight line which lies in the range between 0° and 45°, expediently between 0° and 30°, expediently in the range between 0° and 20°, particularly preferably in the range between 0° and 18°. The rotary axes of different propulsion devices can thereby include different angles with the second straight line.

If the angles are chosen as above, it is possible that the axes of rotation of the propulsion devices point towards (or away from) the geometric center of the polygon with n edges.

Particularly preferably this means that the aircraft comprises 3, 4, 5, 6, 7, 8, . . . propulsion devices which are arranged around the aircraft fuselage in such a way that they form the edges of an equilateral triangle, a square, a regular polygon with 5, 6, 7 edges, or regular polygon with 8 edges, and so on. The fuselage of the aircraft is conveniently positioned substantially in the center of the polygon with n edges, here referring to the geometric center, but not to the center of mass, of the polygon with n edges; because according to the invention, the center of mass of the aircraft need not necessarily coincide with the geometric center (geometric center of mass). The geometric center of an polygon with n edges is defined according to the geometric center of the triangle.

It is expedient that n=2j, j>1. Then it is further expedient that the aircraft fuselage is located between each two opposite propulsion devices of the regular polygon with 2j edges. In this case, it is advantageous if the axes of rotation associated with each of two particular opposing propulsion devices point substantially in the direction defined by a straight line on which the two particular opposing propulsion devices lie. Further, it is advantageous if the aircraft is adapted to perform hovering flight by having two respective opposing propulsion devices rotate in substantially the same direction about their associated axis of rotation during hovering flight. In this case, then, j directions according to the invention can be defined.

Advantageously, the angle between the first straight line and the second straight line is in the range between 60° and 100°, preferably between 60° and 90°, particularly preferably between 70° and 90°, especially preferably between 72° and 90°. As will be shown later, for a regular polygon with (2j+1) edges, j>1, it is particularly advantageous to choose the first straight line and the second straight line (or corresponding directions) such that the angle between the first straight line and second straight line is 90°·(1−1/(2j+1)). Thus, for an (arbitrary) polygon with (2j+1) edges, a particularly preferred range for the angle between the first and second straight lines is given by: [90°·(1−1/(2j+1)); 90°]. If the angles between the axes of rotation of the propulsion devices arranged along the first straight line and the first straight line are in the range [0°; 90°/(2j+1)], and/or the angles between the axes of rotation of the propulsion devices arranged along the second straight line and the second straight line are in the range [0°; 90°/(2j+1)], configurations are implementable in which the axes of rotation of the propulsion devices point in the direction of (or away from) the geometric center of the polygon with (2j+1) edges.

In the case of a regular polygon with 2j edges, j>1, it is convenient to choose the first straight line and the second straight line so that they enclose an angle which is 90°−90°/(2j)·(2j mod 4). Then the first and second straight lines each pass through the geometric center of the polygon with 2j edges. Thus, for an (arbitrary) polygon with 2j edges, a particularly preferred range for the angle between the first and second straight lines is given by: [90°−90°/j; 90°].

If the first straight line and second straight line are determined such that the angle between them is in the range [60°; 90°], and the angles between the axes of rotation of the propulsion devices arranged along the first straight line and the first straight line are in the range [0°; 30°], and/or the angles between the axes of rotation of the propulsion devices arranged along the second straight line and the second straight line are in the range [0°; 30°], the propulsion devices can be arranged in an (arbitrary) regular polygon with n edges (n>2) around the aircraft fuselage, such that the axes of rotation of the propulsion devices are oriented towards (or away from) the geometric center. If n>3 is to be considered, it is sufficient if the angle between the axis of rotation of a propulsion device and the first or second straight line passing through it is in the range [0°; 18°].

Expediently, the second direction is substantially perpendicular, more preferably: perpendicular, to the first direction, and two of the at least four propulsion devices are arranged along the first direction, and the other two of the at least four propulsion devices are arranged along the second direction substantially perpendicular to the first direction. This is an example where the propulsion devices may be arranged around the aircraft fuselage at the edges of a square.

Preferably, the center of mass of the aircraft, when performing hovering flight, is positioned in the first direction at a distance $l_{34}$ from a straight line along which the propulsion devices are arranged in the second direction, wherein $$l_{34_{min}} \leq l_{34} \leq l_{34_{max}},$$

with $$l_{34_{min}} = \frac{(R_{max} + 3) * l + (R_{max} + 1) * 2 * a_{34}}{(R_{max} + 1) * 4} - \frac{l}{2} \text{ and}$$

$$l_{34_{max}} = \frac{(R_{min} + 3) * l + (R_{min} + 1) * 2 * a_{34}}{(R_{min} + 1) * 4} - \frac{l}{2},$$

wherein
$R_{min}$ is a minimum permissible ratio between the thrust vectors of the propulsion devices arranged along the first direction, $R_{max}$ is a maximum permissible ratio between the thrust vectors of the propulsion devices arranged along the first direction, $a_{34}$ is a characteristic number for the propulsion devices arranged along the second direction, and l is the distance between the geometric centers of the propulsion devices arranged in the first direction.

Preferably, the center of mass of the aircraft, when performing hovering flight, is positioned in the second direction at a distance $l_{12}$ from a straight line along which the propulsion devices are arranged in the first direction, wherein $$l_{12_{min}} \leq l_{12} \leq l_{12_{max}},$$

with $$l_{12_{min}} = \frac{(R'_{max} + 3) * l' + (R'_{max} + 1) * 2 * a_{12}}{(R'_{max} + 1) * 4} - \frac{l'}{2} \text{ and}$$

$$l_{12_{max}} = \frac{(R'_{min} + 3) * l' + (R'_{min} + 1) * 2 * a_{12}}{(R'_{min} + 1) * 4} - \frac{l'}{2},$$

wherein
$R'_{min}$ is a minimum permissible ratio between the thrust vectors of the propulsion devices arranged along the second direction, $R'_{max}$ is a maximum permissible ratio between the thrust vectors of the propulsion devices arranged along the second direction, $a_{12}$ is a characteristic number for the propulsion devices arranged along the first direction, and l' is the distance of the geometric centers of the propulsion devices arranged in the second direction.

For both the aircraft according to the first aspect and that according to the second aspect, it may be advantageous to perform hovering flight at approximately the same associated certain predetermined thrust vectors.

Similarly, in any of the aircrafts of the first or second aspects, it may be advantageous to further comprise a displacement device for displacing the center of mass of the aircraft. Expediently, in this regard, the aircraft further comprises a fuel tank for supplying fuel to the propulsion devices and/or a battery for supplying electrical power to the propulsion devices, the displacement device being adapted to relocate fuel from the fuel tank or the battery within the aircraft to thereby position the center of mass such that the aircraft performs hover flight when one or more of the propulsion devices generate the respective associated particular predetermined thrust vector. The center of mass of the aircraft can therefore be dynamically shifted. The advantage is that the center of mass of the aircraft can thus be optimally adapted to diverse flight attitudes. The shifting of the center of mass can be performed by an aircraft control system.

Preferably, the aircrafts according to the first or second aspect comprise a thrust vector control to individually control the thrust vectors of the propulsion devices.

According to a third aspect of the invention, there is provided a method of manufacturing an aircraft according to the first aspect of the invention, comprising the following steps:

positioning the center of mass of the aircraft such that one or more of the propulsion devices generate a particular predetermined thrust vector associated therewith, respectively, to cause the aircraft to perform a hover flight in which all forces acting on the aircraft and all torques acting on the aircraft with respect to the center of mass of the aircraft substantially disappear when
each of the associated axes of rotation is oriented substantially in the transverse direction of the aircraft body, and
each of the at least two propulsion devices rotates in substantially the same direction of rotation about the respective associated axis of rotation.

According to a fourth aspect of the invention, there is provided a method of manufacturing an aircraft according to the second aspect of the invention, comprising the steps of:
positioning the center of mass of the aircraft such that one or more of the propulsion devices generate a particular predetermined thrust vector associated therewith, respectively, to cause the aircraft to perform a hover flight in which all forces acting on the aircraft and all torques acting on the aircraft with respect to the center of mass of the aircraft substantially disappear when
the associated axes of rotation of two of the at least three propulsion devices are oriented substantially in the first direction, and the associated axis of rotation of another of the at least three propulsion devices is oriented substantially in the second direction, and
each of the two propulsion devices with axes of rotation aligned in the first direction in hover flight rotates in substantially the same direction of rotation about the respective associated axis of rotation.

In the preferred case where the aircraft comprises at least four propulsion devices, the associated rotational axes of two of the at least four propulsion devices are oriented substantially in the first direction, and the associated rotational axes of two other of the at least four propulsion devices are oriented substantially in the second direction, and each of the two propulsion devices having rotational axes oriented in the first direction in hover flight rotates in substantially the same rotational direction about the respective associated rotational axis, and/or each of the two propulsion devices having rotational axes oriented in the second direction in hover flight rotates in substantially the same rotational direction about the respective associated rotational axis.

In accordance with a fifth aspect of the invention, there is provided a method of controlling an aircraft having an aircraft body defining a longitudinal direction, a vertical direction, and a transverse direction, the longitudinal direction corresponding to the direction from the tail to the nose of the aircraft, the vertical direction corresponding to the direction of the earth's gravitational force when the aircraft is at rest on the ground, and the transverse direction being perpendicular to the longitudinal direction and the vertical direction, and at least two propulsion devices, each rotatable about a respective associated axis of rotation to generate a respective associated thrust vector, a first plurality of said propulsion devices being disposed along a first straight line parallel to said transverse direction, and a second plurality of said propulsion devices being disposed along a second straight line parallel to said transverse direction, said first straight line being spaced from said second straight line, and the center of mass of said aircraft being positioned with respect to said longitudinal direction between said first straight line and said second straight line. The method comprises the following steps:
determining the associated thrust vectors such that the aircraft performs a hover flight when each of the axes of rotation associated with the at least two propulsion devices is oriented substantially in the transverse direction of the aircraft body, and each of the at least two propulsion devices rotates substantially in the same direction of rotation about the respective associated axis of rotation,
whereby in hover flight all forces acting on the aircraft and all torques acting on the aircraft with respect to the center of mass of the aircraft essentially disappear,
driving each of the propulsion devices in substantially the same direction of rotation such that the respective propulsion device generates the particular associated thrust vector.

In accordance with a sixth aspect of the invention, there is provided a method of controlling an aircraft having an aircraft fuselage, and at least three propulsion devices supported about the aircraft fuselage, each rotatable about an associated axis of rotation to generate a respective associated thrust vector, comprising the steps of:
determining the associated thrust vectors such that the aircraft performs a hover flight when two of the axes of rotation associated with the at least three propulsion devices are oriented substantially in the first direction and rotate substantially in the same direction of rotation about the respective associated axis of rotation, and/or another of the axes of rotation associated with the at least three propulsion devices is oriented substantially in a second direction that is not parallel to the first direction,
whereby in hover flight all forces acting on the aircraft and all torques acting on the aircraft with respect to the center of mass of the aircraft essentially disappear,
aligning the associated axes of rotation of two of the at least three propulsion devices substantially in the first direction, and aligning the associated axis of rotation of the further one of the at least three propulsion devices substantially in the second direction,
driving each of the propulsion devices such that the respective propulsion device rotates in an associated rotational direction and generates the particular associated thrust vector,
wherein each of the propulsion devices having axes of rotation oriented substantially in the first direction rotates substantially in the same direction of rotation about the respective associated axis of rotation.

Preferably, the method is for controlling an aircraft having at least four propulsion devices and comprises the following steps:
determining the associated thrust vectors such that the aircraft performs a hover flight when two of the rotational axes associated with the at least four propulsion devices are oriented substantially in a first direction and rotate substantially in the same rotational direction about the respective associated rotational axis, and/or two other of the rotational axes associated with the at least four propulsion devices are oriented substantially in a second direction that is not parallel to the first direction and rotate substantially in the same rotational direction about the respective associated rotational axis,
whereby in hover flight all forces acting on the aircraft and all torques acting on the aircraft with respect to the center of mass of the aircraft essentially disappear,
aligning the associated axes of rotation of two of the at least four propulsion devices substantially in the first direction, and aligning the associated axes of rotation of the other two of the at least four propulsion devices substantially in the second direction, driving each of the propulsion devices such that the respective propulsion device rotates in an associated rotational direction and generates the particular associated thrust vector, wherein each of the propulsion devices having axes of rotation oriented substantially in the first direction rotates substantially in the same direction of rotation about the respective associated axis of rotation and/or each of the two propulsion devices having axes of rotation oriented substantially in the second direction rotates substantially in the same direction of rotation about the respective associated axis of rotation.

Preferably, in the methods for controlling an aircraft according to the fifth or sixth aspect, all of the determined associated thrust vectors are selected to be approximately identical.

Advantageously, the methods for controlling an aircraft according to the fifth or sixth aspect further comprise the following step:

positioning the center of mass of the aircraft so as to cause all forces acting on the aircraft and all torques acting on the aircraft with respect to the center of mass of the aircraft to substantially disappear when the propulsion devices generate the particular predetermined thrust vector associated therewith.

The advantages of the methods according to the third to sixth aspects of the invention are the same as those already described in connection with the aircrafts according to the invention according to the first and second aspects. The useful, advantageous and preferred embodiments of the first and second aspects therefore apply accordingly to the third through sixth aspects of the invention.

Preferably, in the aircraft or method according to any of the aspects of the invention, each of the propulsion devices is structurally identical.

Particularly preferably, for any aircraft or method according to any aspect of the invention, the propulsion devices comprise cyclogyro rotors.

In a preferred embodiment, each cyclogyro rotor comprises a plurality of rotor blades rotatable along a circular path about a respective associated axis of rotation of the propulsion device or cyclogyro rotor; a pitch mechanism including a coupling device and a mounting device, each of the plurality of rotor blades being pivotally mounted by the mounting device about its rotor blade mounting axis parallel to the axis of rotation of the propulsion device or cyclogyro rotor. Furthermore, the cyclogyro rotor expediently comprises an offset device to which each rotor blade is coupled by the coupling device at a tethering point associated therewith. Thereby, the offset device defines an eccentric bearing axis, which is mounted at an adjustable offset distance parallel to the axis of rotation of the propulsion device or the cyclogyro rotor. As a result, rotation of the rotor blades along the circular path about the axis of rotation of the propulsion device or cyclogyro rotor causes pitch movement of the rotor blades when the offset distance is set to a non-zero value.

In general, however, the requirement for the lift force of an aircraft is largely constant, and an increase is usually not needed, since here it is essentially gravity that must be counteracted. With the help of the offset device, however, the thrust force can now be reduced again due to the increase, resulting in reduced power consumption of the rotor.

FIG. 1 shows a perspective view of an aircraft 100 according to the first aspect of the invention including an aircraft body 120 and a plurality of propulsion devices 1F, 1R. Each of the propulsion devices 1F, 1R may be mounted to the aircraft body 120 with respective mounting or support devices.

The depicted aircraft 100 may be, for example, an air vehicle, a manned aircraft, a drone, or so-called micro air vehicles (MAVs).

To further describe the aircraft, a coordinate system is introduced that defines a longitudinal direction 101 or longitudinal axis, a transverse direction 102 or transverse axis, and a vertical direction 103 or vertical axis. The coordinate system is said to be fixedly anchored to the aircraft 100. The reference directions 101, 102, 103 or axes are defined as follows: The longitudinal direction 101 corresponds to the direction from the tail 122 to the nose 121 of the aircraft 100. Thus, in the example embodiment shown in FIG. 1, the longitudinal direction 101 lies in a horizontal plane (parallel to the ground when the aircraft 100 is resting on the ground), and extends from the tail 122 (i.e., the rear portion) of the aircraft 100 to the bow 121, or nose 121, (i.e., the front portion) of the aircraft 100. The vertical direction 103, or axis, corresponds to the direction of the earth's gravitational force when the aircraft 100 is resting on the (flat) ground. In other words, the vertical direction 103 is perpendicular to the aforementioned horizontal plane comprising the longitudinal direction 101. The transverse direction 102 or axis is perpendicular to both the longitudinal direction 101 and the vertical direction 103. In other words, the transverse direction 102 is in the aforementioned horizontal plane comprising the longitudinal direction 101 and is perpendicular to the longitudinal direction 101.

The aircraft 100 shown has four propulsion devices 1F, 1R. The propulsion devices 1F, 1R shown are cyclogyro rotors. The aircraft 100 shown in FIG. 1 may therefore be referred to as a cyclogyro. The propulsion devices are described in more detail in connection with FIG. 5. Each of these propulsion devices 1F, 1R is mounted for rotation about an axis of rotation 5 associated therewith. Each propulsion device 1F, 1R comprises a plurality of rotor blades 2 which are pivotally mounted about their longitudinal axis. This allows the angle of inclination of the rotor blades 2 to be varied during rotation of the propulsion device 1F, 1R. By controlling the rotation speed (hereinafter also referred to as rotational speed) of the propulsion devices 1F, 1R as well as the control of the tilt angle of the rotor blades 2, the magnitude as well as the direction of the generated thrust force or the thrust vector describing it can be varied.

In FIG. 1, it can be seen that two of the four propulsion devices 1F are located in the front (nose-) portion of the aircraft 100, and two other propulsion devices 1R are located in the rear (tail) portion of the aircraft 100. The front and rear portions of the aircraft are defined as follows: The overall length of the aircraft is measured in the longitudinal direction 101; the foremost portion of the aircraft (i.e., the nose 121 of the aircraft 100) is assigned the relative longitudinal coordinate 0, and the rearmost portion 122 of the aircraft 100 is assigned the relative longitudinal coordinate 100%. In this convention, the forward portion or range is determined to correspond to the (longitudinal) range of 0 to 40% of the total length of the aircraft, and the rear portion or range is determined to correspond to the (longitudinal) range of 60% to 100% of the total length of the aircraft.

The two propulsion devices 1F in the front portion lie on a common straight line that is parallel to the transverse direction 102 or axis; likewise, the two propulsion devices 1R in the rear portion lie on a common straight line that is parallel to the transverse direction 102 or axis. It should be noted that said straight lines need not necessarily be a common axis of rotation to which the propulsion devices are (rigidly) coupled. Each propulsion device 1F, 1R can rotate via its own axis of rotation 5 associated with it, and it is also possible that each of the propulsion devices 1 can be controlled individually, in particular to control their speed of rotation separately. Furthermore, according to the invention, it is not necessary that all of the propulsion devices 1F, 1R lie in the same horizontal plane. As shown in FIG. 1, it may be convenient if the two propulsion devices 1R in the rear portion of the aircraft are arranged elevated with respect to the two propulsion devices 1F in the front portion. This has the advantage that the propulsion devices 1R in the rear portion receive a better inflow and are less affected by the air turbulence and turbulence caused by the propulsion devices 1F in the front portion.

The axes of rotation 5 associated with the propulsion devices 1F, 1R are aligned parallel to the transverse direction 102 in the embodiment of FIG. 1. According to the invention, however, it is not absolutely necessary that all axes of rotation 5 are parallel to each other. According to the invention, it is sufficient if each of the associated rotational axes 5 is aligned substantially in the transverse direction 102 of the aircraft body 120. According to the invention, a rotational axis 5 is oriented substantially in the transverse direction 102 of the aircraft body 120 if the angle included between the rotational axis 5, and an axis running in the transverse direction and intersecting the rotational axis 5 is less than 45°, preferably less than 30°, particularly preferably less than 15°. The designation "substantially aligned in the transverse direction" thus does not preclude the axes of rotation 5 from also being exactly parallel to one another.

The aircraft 100 according to the invention is designed to perform hovering flight by rotating each of the four propulsion devices 1F, 1R shown in the same direction of rotation about the respective associated axis of rotation 5. The design limitations which this imposes on the aircraft 100 will be explained in connection with the further figures, in particular FIGS. 3a and 3b.

In the generalized case where the rotational axes 5 are oriented substantially in the transverse direction 102 of the aircraft body 120, it is required according to the invention that each of the propulsion devices 1 rotates substantially in the same rotational direction about its respective associated rotational axis 5. As already explained in detail in the introduction, this is fulfilled if the scalar product of the vector of the angular velocity of a certain propulsion device 1F, 1R and a fixedly predetermined vector pointing arbitrarily in the transverse direction 102 has the same sign for all propulsion devices 1R, 1F.

Figure 2A:
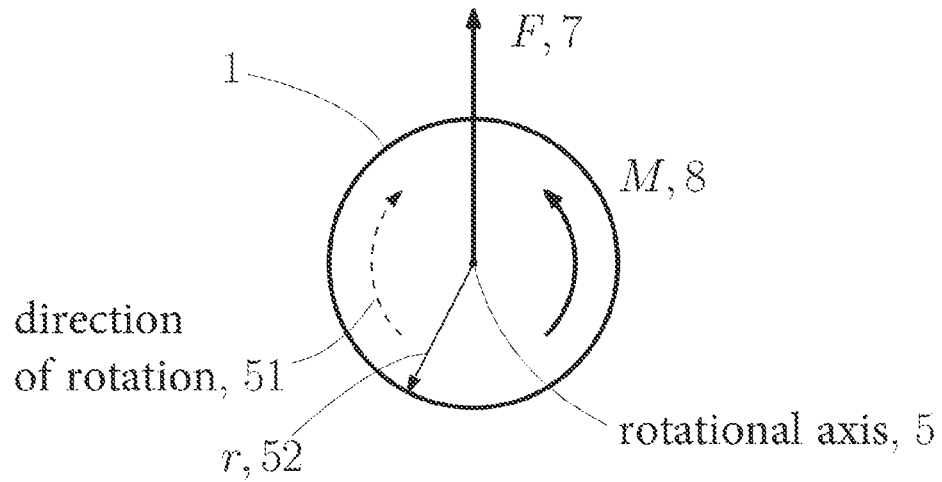
FIG. 2a is a schematic representation of a propulsion device and the forces and torques acting on it.

FIG. 2a illustrates the force 7 and torque 8 acting on a propulsion device 1 rotating about an axis of rotation 5 at a certain rotational speed. In FIG. 2a only the front view of the propulsion device 1 is shown, and this schematically. In the case shown, it is assumed that no air is flowing in through the propulsion device 1. The propulsion device 1 rotates clockwise in the case shown. The vector of angular velocity corresponding to this rotation thus points into the blade plane (according to the right-hand rule).

The thrust vector F, 7 acting on the propulsion device 1 is perpendicular to the axis of rotation 5 of the propulsion device 1. If cyclogyro rotors are used as propulsion devices 1, the thrust vector F, 7 is generated by the periodic adjustment of the rotor blades of the cyclogyro rotors. By means of an offset device of the cyclogyro rotor, the periodic rotor blade adjustment can be changed and thus the thrust vector can be rotated in the entire plane which is normal to the axis of rotation 5 of the cyclogyro rotor and the magnitude of the thrust vector can be changed. A thrust vector control is expediently used for this purpose.

In addition to the thrust vector F, 7, the propulsion device 1 generates a torque M, 8 about the axis of rotation 5 counter to the direction of rotation 51. This torque M, 8 about the axis of rotation 5 results from the air forces (lift and drag forces), or their tangential components, of the propulsion device 1; in the case of a cyclogyro rotor, the air forces are primarily due to the rotating rotor blades. Thus, in order to maintain a constant rotational speed, the propulsion device 1 must generate a (driving) torque that counteracts the torque resulting due to the air forces. However, in order for the propulsion device 1 to be able to generate such a (propulsion) torque also during the flight phase, another torque M, 8 is required, which the aircraft body must apply (according to the principle actio=reactio) in order to "support" the propulsion device 1 in the air. This latter torque M, 8, in order to maintain a constant rotational speed against the air forces, is (neglecting dissipative effects) approximately equal in magnitude to the torque generated by the air forces, and also points in the same direction as the latter. Since the torque generated by the air forces opposes the direction of rotation 51 of the propulsion device 1, the torque M, 8 applied by the aircraft body also opposes the direction of rotation 51 of the propulsion device 1. Assuming that the torque due to the air forces and the torque due to the propulsion device are substantially equal in magnitude but oppositely directed, the net torque remaining due to the rotation of the propulsion device 1 is the torque M, 8 applied by the aircraft body.

This torque M, 8 is thus equivalent to the driving torque of the propulsion device 1. The torque M, 8 can therefore be directly related to the magnitude of the thrust vector F, 7. The design limitations of the aircraft according to the invention already mentioned in connection with FIG. 1 and described still further with respect to FIGS. 3a and 3b can therefore be stated using a mathematical-physical relation between the torque M, 8 and the thrust vector F, 7.

Mathematically (and physically), the relationship between the thrust force or corresponding thrust vector F, 7 and the (driving) torque M, 8 can be explained by following the general equations of a propeller. Due to the position of the rotor blades in relation to the axis of rotation, a classic propeller differs from a cyclogyro rotor, but the generation of thrust in both concepts is based on the targeted displacement of air in one direction by rotor blades. The equations used in the following are derived in the appendix to this description for the sake of completeness.

First, consider the power required to displace the air. This power $P_{air}$ can be derived from the so-called momentum theory (see appendix), which leads to the following expression:

$$P_{air} = F * V_a, \qquad (1)$$

where F is the magnitude of the thrust vector and $V_a$ are the total air flow velocity in the plane of the propulsion device. The said plane of the propulsion device is a plane passing through the axis of rotation of the propulsion device and is perpendicular to the direction of air flow, and thus to the thrust vector F.

This power is provided by the propulsion device 1. First of all, the following applies to the power $P_{propulsion}$ of the propulsion device in general:

$$P_{propulsion} = M * \omega, \quad (2)$$

where M is the magnitude of the (drive) torque M, 8 and ω is the rotational speed (magnitude of the vector of angular velocity) of the propulsion device 1.

The relationship between the two powers $P_{air}$ and $P_{propulsion}$ can be described via the efficiency n can be described as follows:

$$P_{air} = \eta * P_{propulsion} \quad (3)$$

The efficiency n indicates how effectively the drive power is $P_{propulsion}$ is converted into an air flow. The ratio between the rotational speed ω and radius r, 52 of the propulsion device 1, on the one hand, and the total flow velocity $V_a$, on the other hand, is a dimensionless parameter of the propulsion device 1 and is denoted here by H (in the case of propellers, this is usually called "advance ratio"):

$$H = \frac{V_a}{\omega * r}. \quad (4)$$

The relationship between the (driving) torque M, 8 and the thrust force or thrust vector F, 7 can then be established starting from equation (3) and inserting the equations (1), (2) and (4).

$$M = \frac{H * r}{\eta} * F. \quad (5)$$

This relationship is now only dependent on the key figures H, r and η of the propulsion device 1. The relationship between (the magnitudes of) (drive) torque M, 8 and thrust force or thrust vector F, 7 can therefore be described as a linear function with a general proportionality factor a can be described:

$$M = a * F. \quad (6)$$

This relation will be used further later.

Figure 2B:
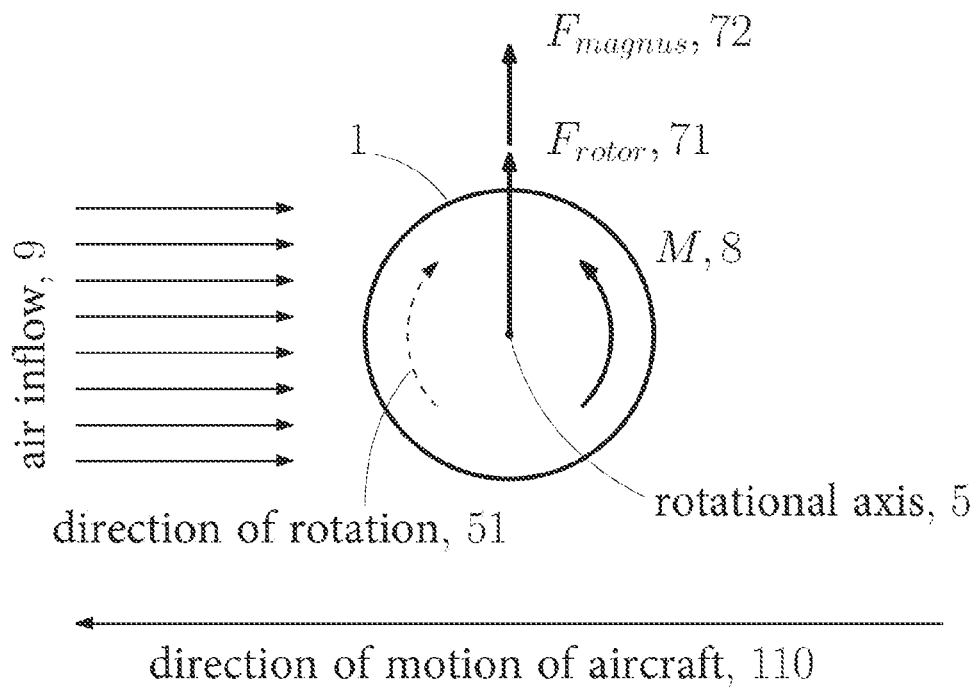
FIG. 2b is a schematic representation of a propulsion device in forward flight of the aircraft and the forces and torques acting on it, taking into account an incident flow.

FIG. 2b schematically shows a propulsion device 1 in forward flight. The direction of movement of the aircraft comprising the propulsion device 1 shown is indicated by the arrow 110. The torque M, 8, which corresponds to the drive torque of the propulsion device 1, has already been described in connection with FIG. 2a. It is shown that the propulsion device 1 is flowed against by air from outside 9. The flow 9 of air changes the aerodynamic properties at the propulsion device 1 and thus the properties of the generated thrust vector. If the aircraft and thus the propulsion device 1 is in forward flight, air is actively flowing against the propulsion device 1 from the front.

As stated in the introduction, the changed properties on the propulsion device 1 can be approximately explained by the Magnus effect, which states that a rotating round body in a flow experiences a transverse force normal to the direction of flow.

The direction of the transverse force depends on the direction of rotation 51 of the body, here, of the propulsion device 1. Due to the Magnus effect, in addition to the thrust force described with regard to FIG. 2a, the vertical component of which is designated $F_{rotor}$, 71 in FIG. 2b, an additional thrust force or an additional contribution $F_{magnus}$, 72 to the thrust vector is generated in the vertical direction. This increases the total thrust force acting in the vertical direction, the so-called lift force, of the propulsion device 1. In general, however, the requirement for the lift force of an aircraft is largely constant and an increase is usually not needed, since in this case it is essentially the gravitational force of the earth that must be counteracted.

Due to the noticeable contribution $F_{magnus}$, 72 to the thrust vector occurring in forward flight, the contribution $F_{rotor}$, 71 of the thrust vector generated by the propulsion device 1 can be reduced. This is associated with a reduced power consumption of the propulsion device 1. Simplified described, the Magnus effect replaces a part of the thrust force of the propulsion device 1 and thus reduces the power requirement in forward flight compared to hover flight.

However, if the propulsion device 1 were to rotate in the opposite direction while the incident flow 9 remained constant, the additional transverse force $F_{magnus}$, 72 of the Magnus effect would act in opposition to the thrust force $F_{rotor}$, 71 and thus reduce the total thrust force or increase the power requirement for the same required lift force.

In the aircrafts according to the invention, the described positive effect of the Magnus effect is exploited in that in hover flight and in forward flight of the aircraft, all propulsion devices rotate in the same direction of rotation about the associated axes of rotation. In the generalized arrangement with the axes of rotation oriented substantially in the transverse direction of the aircraft body, the propulsion devices rotate in substantially the same direction of rotation, as discussed in more detail above.

If the propulsion devices 1 rotate in substantially the same direction about their respective associated axis of rotation, the faster the aircraft flies in forward flight, the greater the contribution to the lift force by the lateral force $F_{magnus}$, 72. That is, it is sufficient to configure the aircraft in hover flight, where the incident air velocity 9 is generally lowest, to also realize a stable attitude in forward flight of the aircraft.

The conditions for stable flight attitude in hover as well as in forward flight (equilibrium of all forces and torques acting on the aircraft) have been generally stated already by way of introduction; hereinafter, in connection with FIGS. 3a and 3b, design limitations for the aircraft according to the first aspect of the inventions are derived from these conditions.

Figure 3A:
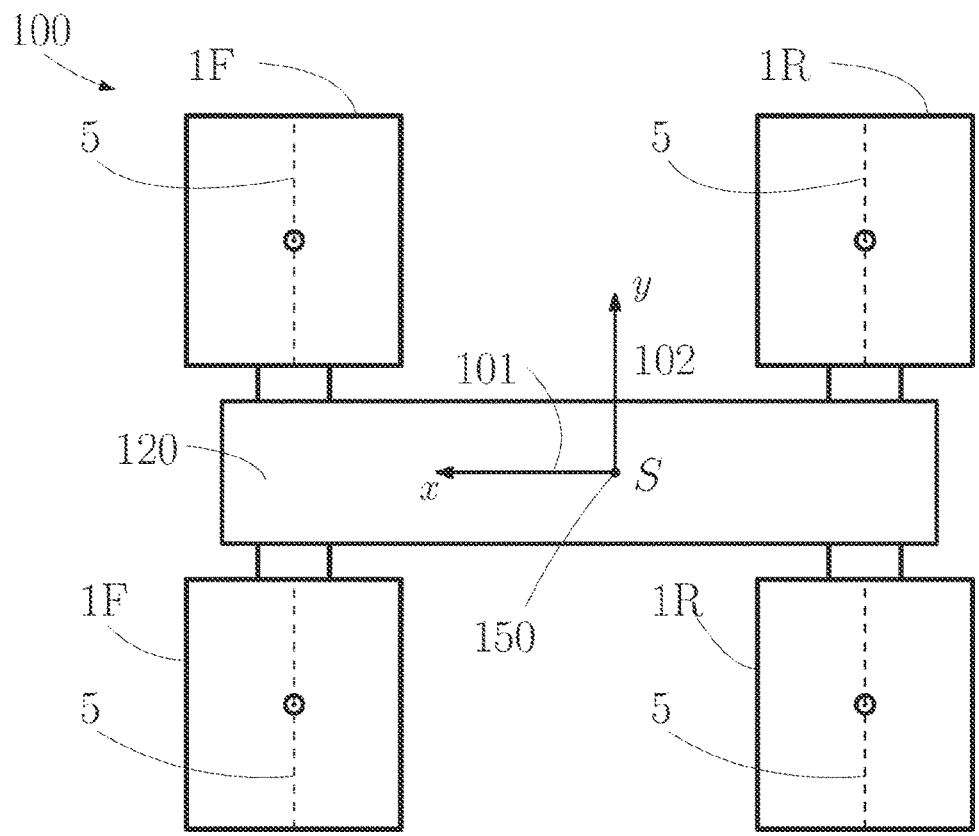
FIG. 3a is a schematic representation of the aircraft according to the first aspect of the invention in top view.

In FIG. 3a, an aircraft 100 according to the first aspect of the invention is shown in a highly schematic representation in plan view. In addition to the aircraft body 120 already described in connection with FIG. 1, the propulsion devices 1F and 1R, the axes of rotation 5 and longitudinal direction 101 and transverse direction 102 respectively associated with them, the center of mass S, 150 of the aircraft 100 can also be seen. The position or positioning of the center of mass S, 150 is of central importance for balancing the torques of the same direction caused by the propulsion devices 1 rotating in substantially the same direction of rotation. This is described in more detail with reference to FIG. 3b.

Figure 3B:
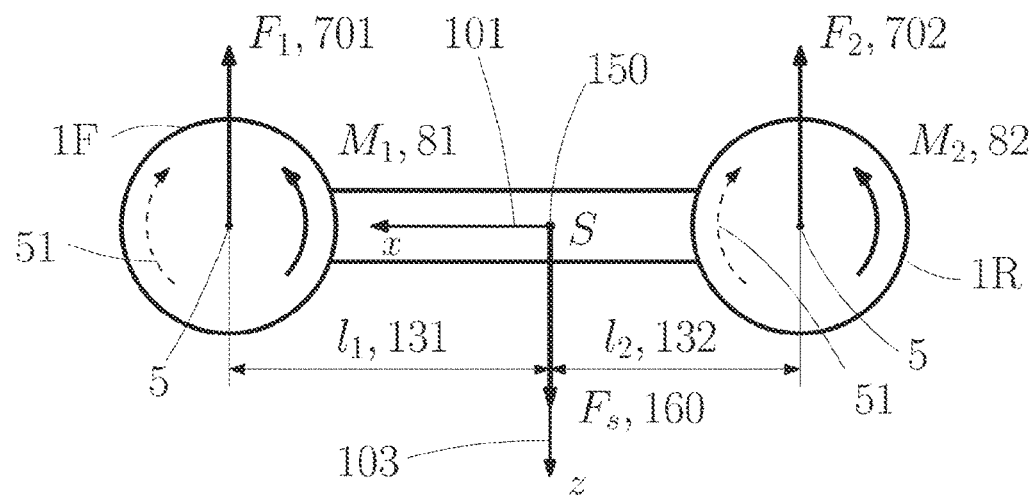
FIG. 3b is a schematic side view of the aircraft according to the first aspect of the invention and the forces and torques acting thereon.

FIG. 3b shows the aircraft according to the first aspect of the invention, shown in top view in FIG. 3a, in side view and in a highly schematic view. In this side view, only one of the two propulsion devices 1F arranged in the front area of the aircraft and one of the two propulsion devices 1R arranged in the rear portion of the aircraft can be seen. Furthermore, in FIG. 3b, the four propulsion devices 1F and 1R are arranged in a horizontal plane. However, the following explanations also apply in the case that not all propulsion devices are located in a horizontal plane. The axes of rotation associated with the propulsion devices 1F and 1R are parallel to each other and parallel to the transverse direction (which points into the sheet plane).

According to the invention, all four propulsion devices 1F, 1R rotate in the same direction of rotation 51 with a certain assigned rotational speed. In FIG. 3b, all propulsion devices 1F and 1R rotate clockwise, which means that all four propulsion devices are clockwise with respect to the transverse direction (y-axis) indicated in FIG. 3a. In other words, the scalar product of each of the vectors of angular velocity associated with the propulsion devices 1F, 1R with the unit vector in the transverse direction is positive. Independent from the reference frame used, it can also be said that the propulsion devices rotate in such a way that the surface of the propulsion devices which first meets the incident air in forward flight rotates against the direction of the earth's gravitational force. When the propulsion devices rotate clockwise, the Magnus effect has a particularly positive effect. This applies to any number of propulsion devices.

As explained above, a thrust vector is generated by the rotation of each propulsion device 1F, 1R. In the notation according to FIG. 3b, the thrust vector generated jointly by the two propulsion devices 1F arranged in the front area is denoted by $F_1$, 701, and the thrust vector generated jointly by the two propulsion devices 1R arranged in the rear area is denoted by $F_2$, 702. Because all propulsion devices 1F and 1R rotate in the same direction of rotation 51, all resulting (drive-) torques $M_1$, 81, $M_2$, 82 also act in the same direction, where here $M_1$, 81 denotes the (drive-) torque of both front propulsion devices 1F, and $M_2$, 82 denotes the (drive-) torque of both rear propulsion devices 1R.

Now the momentum and balance of angular momentum theorems are set up around the center of mass S, 150 of the aircraft, whereby in the case shown only the momentum theorem in the vertical direction 103 (z-axis) and the balance of angular momentum theorem around the transverse direction (y-axis) are relevant, since forces or torques only act here.

The conditions for a stable hover are then:

$$\sum F_Z = F_S - F_1 - F_2 = 0 \qquad (7)$$

$$\sum M_{s,y} = F_1 * l_1 - F_2 * l_2 - M_1 - M_2 = 0. \qquad (8)$$

The thrust vectors $F_1$ and $F_2$ can be adjusted to satisfy the two equilibrium conditions. Conveniently, the thrust vectors are set by the thrust vector control. $l_1$, 131 and $l_2$, 132 indicate, with respect to the longitudinal direction, the distance of the center of gravity S, 150 from the propulsion devices 1F in the front region and 1R in the rear region, respectively. $F_S$, 160 denotes the weight force of the entire aircraft.

However, it is also possible to use the two equilibrium conditions to determine the center of mass of the aircraft in such a way that said hover conditions are satisfied for certain specified thrust vectors $F_1$ and $F_{0.2}$ The torques $M_1$, 81 and $M_2$, 82 shown in FIG. 3b correspond to the drive torques of the two propulsion devices 1F and the two propulsion devices 1R, respectively. There is a mathematical-physical relationship between the magnitudes of the torques $M_1$, 81 and $M_2$, 82 and the magnitudes of the thrust vectors $F_1$, 701 and $F_2$, 702 of the corresponding propulsion devices 1F and 1R, respectively. This is determined by equation (6) given above. That is, the magnitudes of the torques $M_1$, 81 and $M_2$, 82 are proportional to the generated magnitudes of the thrust vectors $F_1$, 701 and $F_2$, 702, respectively. Thus, the torques cannot be controlled freely.

As stated above in connection with equation (6), the proportionality factor a of any propulsion device is essentially dependent on the efficiency of the propulsion device, its angular velocity and other key figures of the propulsion device.

Each propulsion device can have a different proportionality factor a have. However, the values of a of different propulsion devices of the same design or size typically assume the same order of magnitude. Expediently, they are essentially identical.

According to equation (6), the magnitudes $M_1$, $M_2$ of the torques $M_1$, 81 and $M_2$, 82, respectively, can be written as $$M_i = a_i * F_i, \quad i \in \{1, 2\}.$$

This results in the torque equation (8) as follows $$\sum M_{s,y} = F_1 * l_1 - F_2 * l_2 - F_1 * a_1 - F_2 * a_2 = 0.$$

This equation can now be transformed into a ratio of the magnitudes $F_1$ and $F_2$ of the two thrust vectors $F_1$, 701 and $F_2$, 702, respectively:

$$\frac{F_1}{F_2} = \frac{(l_2 + a_2)}{(l_1 - a_1)}. \qquad (9)$$

Equation (9) can serve as a configuration formula for the aircraft. Equation (9) initially contains three freely selectable quantities (from the set of $F_1$, $F_2$, $l_1$, $l_2$), however, equation (7) still has to be considered in a stable flight attitude, which is why only two of the aforementioned four quantities can be freely selected.

Therefore, there are several ways to satisfy equations (7) and (9).

(i) In a first case design, it may be required that the aircraft is symmetrically designed. That is, the front axes of rotation 5, that is, the axes of rotation of the propulsion devices 1F arranged in the front region of the aircraft, and the rear axes of rotation 5, that is, the axes of rotation of the propulsion devices 1R arranged in the rear region of the aircraft, are equidistant from the center of mass S, 150. In other words, the center of mass S, 150 is located midway between the front and rear axes of rotation 5 with respect to the longitudinal direction. In this case one has $l_1=l_2$. Then it follows from equation (9) and because of $$\frac{(l_1 + a_2)}{(l_1 - a_1)} > 1,$$

that the front propulsion devices 1F must generate more thrust that the rear propulsion devices 1R, so $F_1 > F_2$. Thus, the front propulsion devices 1F must be designed larger than the rear propulsion devices 1R.

In this configuration, the center of mass S, 150 will therefore tend to move forward, with the result that $l_1 < l_2$, and the required thrust vectors $F_1$ and $F_2$ of the propulsion devices 1F and 1R, respectively, will continue to increase.

(ii) In a second case design, the propulsion devices 1F and 1R are particularly preferably structurally identical. That is, they are structurally identical and have, for example, the same size, the same span, the same number of rotor blades, the same diameter, and/or generate similar or the same (maximum) thrust forces/thrust vectors. In this case, therefore, $F_1 = F_2$ or $F_1 \approx F_2$.

With $F_1 = F_2 = F$ it initially follows from equation (7) $F = F_S/2$. From equation (9) we then obtain $$l_1 - a_1 = l_2 + a_2.$$

If the distance in the longitudinal direction between the front propulsion devices 1F and rear propulsion devices 1R is $l = l_1 + l_2$ then it follows from the last equation:

$$l_1 = \frac{l}{2} + \frac{a_1 + a_2}{2}, \quad (10)$$

$$l_2 = \frac{l}{2} - \frac{a_1 + a_2}{2}. \quad (11)$$

It is recognized that the center of mass S, 150 of the aircraft is shifted longitudinally from the center $l/2$ between the front rotational axes 5 of the front propulsion devices 1F and the rear rotational axes 5 of the rear propulsion devices 1R toward the rear rotational axes 5 of the rear propulsion devices 1R by $(a_1 + a_2)/2$. Typically, in this case $a_1 = a_2 \equiv a$.

If an aircraft is now configured with structurally identical, equally sized propulsion devices 1F and 1R and thus approximately equally sized thrust forces/thrust vectors $F_1$, 701 and $F_2$, 702 per pair of propulsion devices 1F and 1R, respectively, the center of mass S, 150 can thus be optimally positioned such that the torques $M_1$, 81 and $M_2$, 82 generated by the propulsion devices are balanced purely by the position of the center of mass S, 150. The said optimum position is determined by equations (10) and (11).

Here and in the following, it must be noted that only the position of the propulsion devices and center of mass in the longitudinal direction 101 plays a role for the considerations. The mounting or positioning of the propulsion devices and center of mass with respect to the transverse direction and vertical direction 103 is not relevant here and is at the discretion of the person skilled in the art. However, a preferably symmetrical bearing or positioning in the two latter directions is preferable.

(iii) According to the invention, it is also possible for aspects of the first case design (i) and of the second case design (ii) to be combined. That is, the center of mass S, 150 of the aircraft can be shifted from the center between the front and rear rotational axes of the propulsion devices 1F and 1R, respectively, in such a way that the conditions (7) and (8) for stable hovering flight at certain predetermined, even different, thrust vectors/thrust forces of individual ones of the propulsion devices are satisfied.

For practical applications, it is not always possible to place the masses in an aircraft in such a way that the overall center of mass S, 150 can be positioned exactly at the specified optimum position described in case designs (i), (ii) or (iii); for example, for case design (i) $l_1 = l_2$; for case design (ii) $l_1$ and $l_2$ are given by equations (10) and (11). Therefore, a range is defined below in which the center of mass S, 150 can be located so that it is still possible to support the torque balance with the thrust forces/thrust vectors $F_1$, 701 and $F_2$, 702 of the pairs of propulsion devices 1F and 1R, respectively. For this purpose, it is assumed that a pair i of propulsion devices can generate a maximum permissible (usually predetermined) thrust force/maximum permissible thrust vector of $F_{i,max}$. It is assumed that $F_{i,max}$ are greater than or equal to the thrust forces corresponding to the optimal configuration $F_{i,opt}$. This is due to the fact that an aircraft needs at least the thrust forces of $F_{i,opt}$ to remain in a stable hover flight; in the preferred case, each pair of propulsion devices still produces a thrust surplus that can be used, among other things, to deviate the position of the center of gravity S, 150 from the optimal position. $F_{i,max}$ is the maximum thrust allowed by the thrust vector control of a propulsion device, which thus, must always be greater than or equal to the thrust for the optimum design $F_{i,opt}$.

Considering the impulse theorem according to equation (7), we get:

$$F_{1,opt} \leq F_{1,max} \Rightarrow F_{2,opt} \geq F_{2,min} \equiv F_s - F_{1,max}.$$

This allows a maximum permissible thrust vector ratio to be defined:

$$R_{max} = \frac{F_{1,max}}{F_{2,min}}.$$

And accordingly:

$$F_{2,opt} \leq F_{2,max} \Rightarrow F_{1,opt} \geq F_{1,min} \equiv F_s - F_{2,max}$$

and thus a minimum permissible thrust vector ratio of $$R_{min} = \frac{F_{1,min}}{F_{2,max}}.$$

These thrust vector ratios $F_1/F_2$ are also described by equation (9); using the latter, the maximum permissible distance in the longitudinal direction of the center of mass S, 150 from the front axes of rotation 5 is determined as $$l_{1_{min}} = \frac{a_1 + a_2}{2} + \frac{l}{R_{max} + 1}$$

and the minimum permissible distance in the longitudinal direction of the center of mass S, 150 from the front axes of rotation 5 as $$l_{1_{min}} = \frac{a_1 + a_2}{2} + \frac{l}{R_{max} + 1}$$

If the center of mass S, 150 is outside the range $$l_{1_{min}} \leq l_1 \leq l_{1_{max}}, \tag{12}$$

it is no longer possible to compensate for the deviation of the center of mass S, 150 from the optimum position according to equation (10) by the thrust forces $F_1$, 701 and $F_2$, 702 of the propulsion devices 1F and 1R, respectively.

Figure 3C:
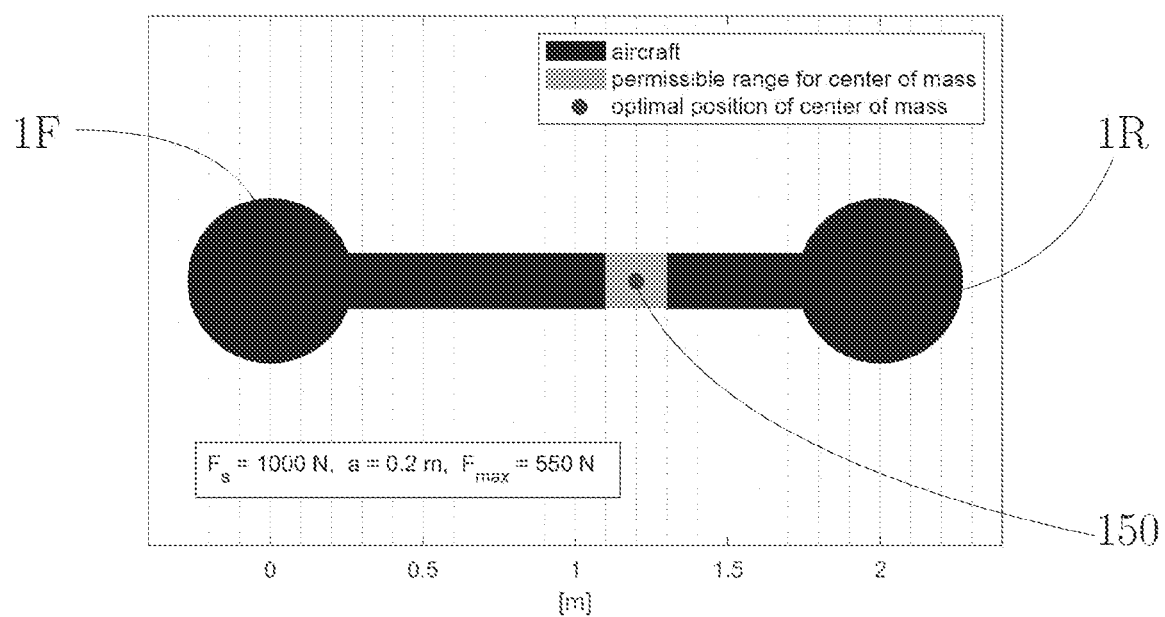
FIG. 3c is an example configuration of an aircraft with four parallel and equally sized propulsion devices to illustrate the preferred center of mass position of the aircraft.

FIG. 3c serves to illustrate the above-described area in which the center of mass S, 150 of the aircraft may suitably be located for implementing the invention according to the first aspect. FIG. 3c schematically illustrates an aircraft comprising propulsion devices 1F, 1R arranged along two straight lines each parallel to the transverse direction of the aircraft. Expediently, the aircraft comprises four propulsion devices 1F, 1R, two 1F of which are arranged in the front region and two 1R of which are arranged in the rear region, as already described in connection with FIGS. 3a and 3b. It is further assumed that the propulsion devices 1F, 1R are structurally identical (as in case design (ii)), here in particular: $a_1 = a_2 \equiv a$.

First, it is further assumed that the torque compensation is to be realized purely via the position of the center of mass S, 150, whereby $$F_{1,opt} = F_{2,opt} = F_{opt} \Rightarrow M_{1,opt} = M_{2,opt} = M_{opt}$$

applies. For the example of the aircraft considered here, a total weight force generated by a corresponding total mass of $$F_s = 1000 \text{ N},$$

Is assumed; the ratio/proportionality factor is typically $$a = 0.2m;$$

the distance of the propulsion devices in the longitudinal direction is defined as $$l = l_1 + l_2 = 2 \text{ m}.$$

Based on these specifications, equations (10) and (11) yield an optimum center of mass position of $$R_{opt} = 1 = \frac{F_{1,opt}}{F_{2,opt}} = \frac{l_{2,opt} + a}{l_{2,opt} - a} \Rightarrow l_{1,opt} = \frac{l}{2} + a =$$

$$1.2 \text{ m} \Rightarrow l_{2,opt} = \frac{l}{2} - a = 0.8 \text{ m}.$$

If it is not possible to place the overall center of mass S, 150 of the aircraft at the position $l_{1,opt} = 1.2$ m a range is now defined in which the position of the center of mass S, 150 can be located, so that the torque compensation can be compensated by the thrust forces/thrust vectors of the propulsion devices 1F, 1R. For this purpose, the maximum permissible thrust force that can be generated by all propulsion devices arranged along a straight line, which is expediently controlled by the thrust vector control, is defined as $$F_{i,max} = 550 \text{ N}.$$

This specification allows to calculate the maximum and minimum permissible thrust vector ratio $$R_{max} = \frac{11}{9} \text{ and } R_{min} = \frac{9}{11}$$

and the range for the position of the center of mass according to equation (12)

$$l_{1_{max}} = 1.3m \text{ and } l_{1_{min}} = 1.1m$$

$$1.1 \text{ m} \leq l_1 \leq 1.3 \text{ m}$$

That is, in this example, the center of mass is conveniently located 1.1 to 1.3 m away from the front axes of rotation of the corresponding front propulsion devices 1F in the longitudinal direction.

Figure 4:
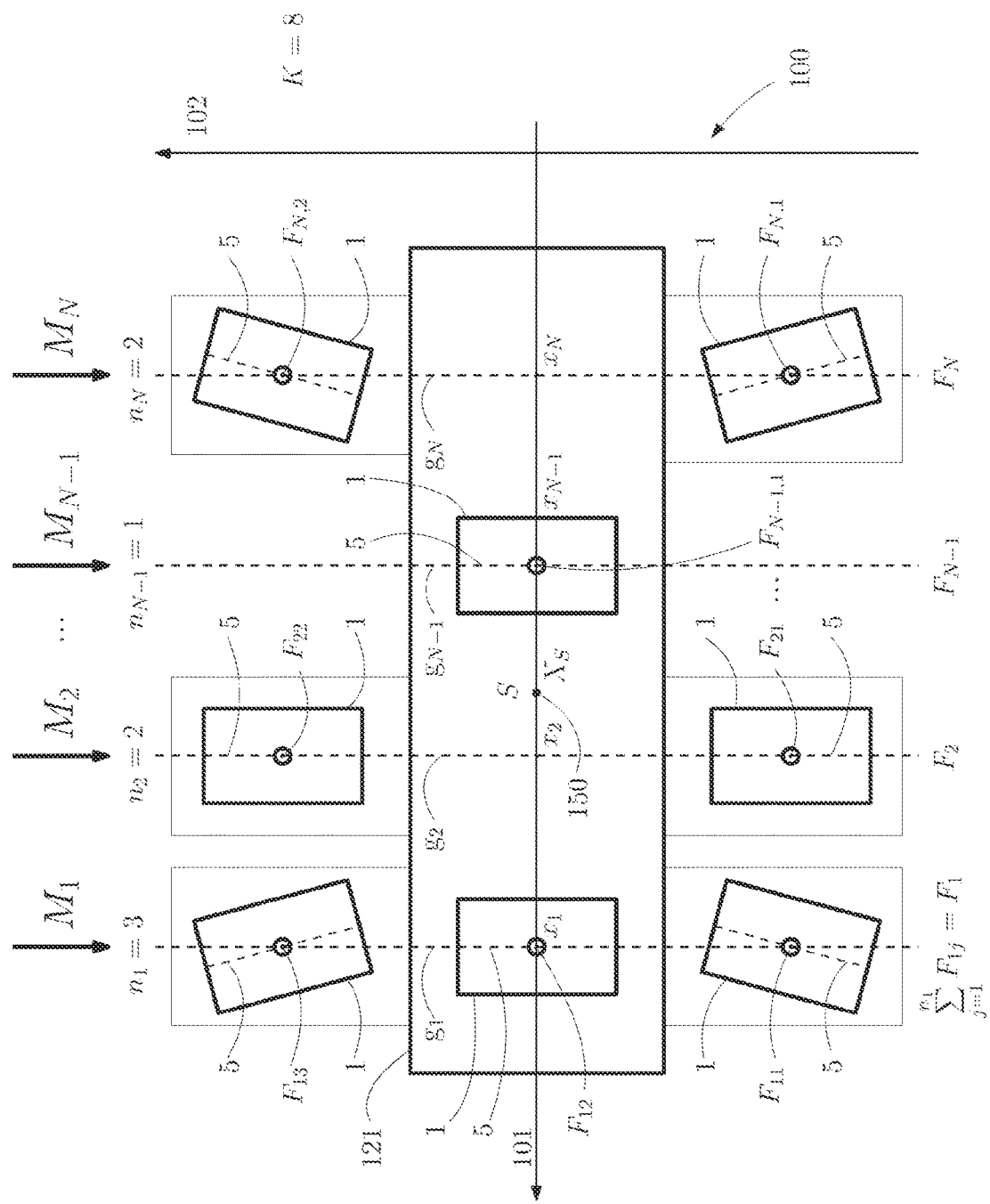
FIG. 4 is a schematic representation of the aircraft according to the first aspect of the invention in top view to generalize the conditions for stable flight attitude.

FIG. 4 shows a further embodiment of an aircraft 100 according to the first aspect of the invention. This FIG. 4 serves primarily to generalize the results derived in connection with FIGS. 3a, 3b and 3c for any number K>2 of propulsion devices 1. It has already been pointed out above that for the considerations according to the invention it is primarily a question of the positioning of the propulsion devices 1 in the longitudinal direction. The propulsion devices can thus be positioned at different heights in the vertical direction, for example. The longitudinal direction is distinguished in FIG. 4 as x-axis 101. It is assumed that the K propulsion devices of the aircraft are arranged along N>1 straight lines $g_i$. As stated earlier, said straight lines are not structural components of the aircraft 100, but serve only to illustrate the geometric arrangement of the propulsion devices 1. On a certain straight line $g_i$ (indicated by index i, i=1, ..., N) $n_i$, i=1, ..., N, propulsion devices 1 shall be arranged. Thus $$\sum_{i=1}^{N} n_i = K.$$

Furthermore, it is assumed that all $n_i$ propulsion devices 1 arranged on a straight line $g_i$ with index i generate a total thrust force/a total thrust vector with magnitude $$F_i = \sum_{j=1}^{n_i} F_{ij}$$

(where $F_{ij}$ is the thrust vector generated by the j-th propulsion device arranged on the straight line $g_i$); the magnitude of the total (drive) torque of all the $n_i$ propulsion devices arranged on the straight line $g_i$ with index i is $M_i$. For each i=1, ..., N the following relation thus holds according to equation (6):

$$M_i = a_i * F_i,$$

where for each straight line $g_i$ with index i a ratio/proportionality factor $a_i$ is introduced.

It should be noted that although the straight lines $g_i$, along which the propulsion devices 1 are arranged, are aligned parallel to the transverse direction 102, it is not absolutely necessary according to the invention that all axes of rotation 5 of the propulsion devices 1 are aligned (mathematically exactly) parallel to each other or to the transverse direction 102. It is sufficient if the axes of rotation 5 of the propulsion devices 1 are aligned substantially in the transverse direction 102, especially in hover flight, in the sense defined at the outset. In FIG. 4 it is shown that the axes of rotation 5 of some propulsion devices 1 are not aligned exactly parallel to the transverse direction 102. According to the invention, the propulsion devices 1 are nevertheless arranged on a straight line $g_i$, which is parallel to the transverse direction 102, because their geometric center is substantially located on such a straight line $g_i$; it is also possible, in order to satisfy the condition of arrangement on a parallel straight line, that the bearing points of the propulsion devices 1 are substantially located on such a straight line $g_i$.

Each of the straight lines $g_i$ with index i is located in longitudinal direction 101 (x-axis) at a point with coordinate $x_i$, i=1, . . . , N where $x_i-x_{i-1}>0$ is assumed without restriction of generality. The longitudinal positions $x_i$ of the line $g_i$ are fixed but arbitrary.

The center of mass S, 150 of the aircraft 100 is located with respect to the longitudinal direction 101 at the coordinate $X_S$. It is noted that while in connection with FIGS. 3a, 3b, 3c the distances $l_1$ and $l_2$ of the straight lines from the center of mass were considered, here the coordinates with respect to the longitudinal direction 101 of the straight line $g_i$ are used; this proves to be more convenient here. Nevertheless, the relationship between coordinates of the straight lines $g_i$ and their distances $l_i$ from the center of mass S, 150 can be easily established:

$$l_i = |x_i - X_S|.$$

With the notations introduced, the conditions for stable hover or forward flight from equations (7) and (8) can be generalized as follows:

$$\sum F_z = F_s - \sum_{i=1}^{N} F_i = 0 \tag{13}$$

$$\sum M_{s,y} = \sum_{i=1}^{N} F_i * (x_i - X_S) - \sum_{i=1}^{N} M_i = \tag{14}$$

$$0 \Rightarrow \sum M_{s,y} = \sum_{i=1}^{N} F_i * (x_i - X_S) - \sum_{i=1}^{N} a_i * F_i = 0.$$

Substituting equation (13), it follows from equation (14):

$$\sum_{i=1}^{N} F_i(x_i - a_i) = X_S * F_s,$$

thus for the coordinate $X_s$ of the center of mass S, 150 one has:

$$X_S = \sum_{i=1}^{N} \frac{F_i}{F_s}(x_i - a_i). \tag{15}$$

An intermediate result is to be noted here: From equation (15) it is possible to calculate the coordinate $X_s$ of the center of mass S, 150 if the thrust vectors $F_i$ are given; however, equation (13) provides another condition which must be fulfilled for a stable flight attitude. Therefore, not all N thrust vectors $F_i$ can be given arbitrarily, but only N−1. That is, the position $X_S$ of the center of mass S, 150 for a stable flight attitude, especially hovering flight, is determined if N−1 thrust vectors are given. The values of the given thrust vectors can of course also be equal.

The distance with respect to the longitudinal direction of the center of mass S, 150 from the foremost straight line $g_i$ or propulsion device closest to the bow 121 or nose 121 of the aircraft 100 with respect to the longitudinal direction is:

$$x_1 - X_S = x_1 - \sum_{i=1}^{N} \frac{F_i}{F_s}(x_i - a_i).$$

We now first consider the case where the propulsion devices 1 arranged on a straight line $g_i$ generate approximately equal thrust forces/thrust vectors $F_i$ for each straight line, i.e. $F_1 \approx F_2 \approx \ldots \approx F_{N-1} \approx F_N \equiv F$. The center of mass S, 150 will thus optimally be positioned in such a way that the torques $M_i$ generated by the propulsion devices 1 are balanced purely by the position of the center of mass S, 150. Said optimal position is determined by equations (13) and (15). From equation (13) it follows $$F_i = \frac{F_s}{N} \equiv F$$

And thus from equation (15):

$$X_S = \frac{1}{N}\sum_{i=1}^{N}(x_i - a_i). \tag{16}$$

In this case it can be conveniently assumed that $a_i = a$, i=1, . . . , N.

A maximum permissible range for the (longitudinal, x) coordinate $X_s$ of the center of mass S, 150 can be determined analogously to the considerations for FIG. 3b also for the general case described above, using equations (13), (14) and (15).

Figure 5:
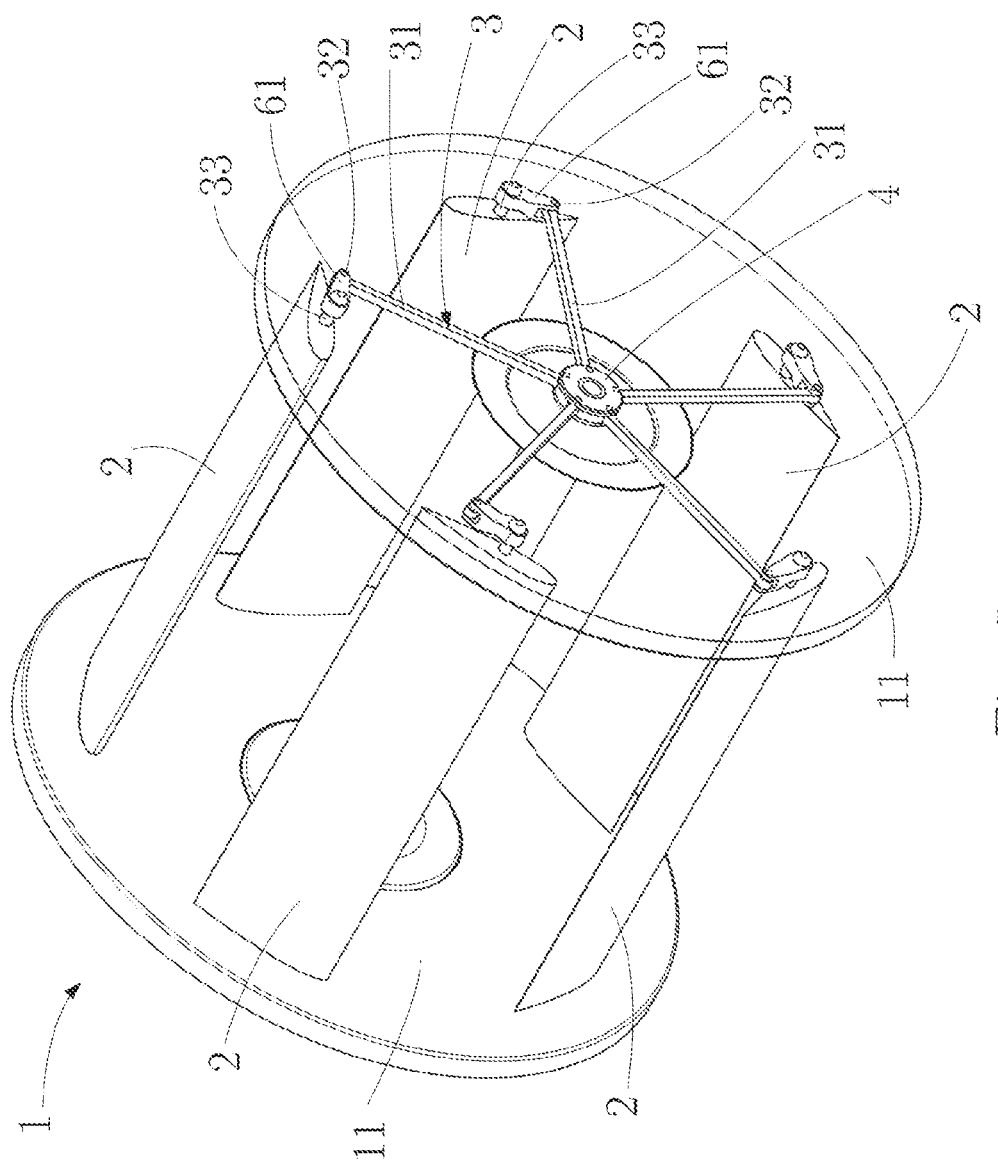
FIG. 5 is a perspective view of a propulsion device according to the invention.

FIG. 5 shows an embodiment of the propulsion devices which can be used in an aircraft according to the invention. Each of these propulsion devices 1 is rotatably mounted about an axis of rotation. Each propulsion device 1 comprises a plurality of rotor blades 2 which are mounted to pivot about their longitudinal axis. This allows the angle of inclination of the rotor blades 2 to be varied during rotation of the propulsion device 1. By controlling the speed of rotation of the propulsion devices 1 as well as controlling the angle of inclination of the rotor blades 2, the magnitude as well as the direction of the generated thrust vector can be varied.

FIG. 5 shows a perspective view of a propulsion device 1 according to the invention. The propulsion device 1 is cylindrical in shape. The propulsion device 1 shown is a cyclogyro rotor. This propulsion device 1 comprises five rotor blades 2, each with an associated pitch mechanism 3, an offset device 4 and a disk 11. Propulsion devices with a different number of rotor blades are also possible. The rotor blades 2 are mounted rotatably about an axis of rotation of the propulsion device 1. The offset device 4 defines an eccentric bearing axis, which is mounted eccentrically with respect to the axis of rotation of the propulsion device 1. In FIG. 5, the offset device is shown as an offset disk. The offset disk is mounted so as to be freely rotatable about the eccentric bearing axis. The eccentric bearing of the offset disk 4 implies an eccentric bearing of the pitch mechanism 3. The eccentric bearing of the pitch mechanism 3 causes a change in the position of the rotor blades 2 during one rotation about the axis of rotation of the propulsion device 1. Each of the pitch mechanisms 3 shown comprises a coupling device 31 and a bearing device 33. Each rotor blade 2 is pivotally supported by the corresponding bearing device 33. The rotor blade 2 is supported about an axis parallel to the axis of rotation of the propulsion device 1. This axis is the rotor blade bearing axis 33. The bearing of the rotor blade 2 can be done, for example, with the help of a bearing means, such as one or more pins, so-called main pin. The bearing means is preferably a part of the bearing device 33. The rotor blade bearing axis 33 can run through the center of mass of the rotor blade 2. Preferably, however, the rotor blade 2 is supported at a distance from the center of mass. The coupling device 31 of the pitch mechanism 3 couples the rotor blade 2 to the offset device 4 such that the rotor blade 2 performs a pitch motion when it rotates about the axis of rotation of the propulsion device 1, and provided that the eccentric bearing axis does not coincide with the axis of rotation of the propulsion device 1. One end portion of the coupling device 31 is coupled to the offset device 4 at a tethering point. The other end piece of the coupling device 31 is coupled to the rotor blade 2.

The offset disk 4 is freely rotatably mounted. The axis of rotation of the offset disk 4 preferably runs parallel to the axis of rotation of the propulsion device 1 at a certain offset distance. This results in the eccentric mounting of the offset disk 4 with respect to the axis of rotation of the propulsion device 1. This offset distance can be adjustable. An offset device 4 with adjustable eccentricity can be realized, for example, by a planetary gear. A pitch movement of the rotor blades 2 results when the offset distance is not zero.

The coupling device 31 is coupled to the rotor blade 2 at a coupling point 32. For this purpose, the coupling device 31 may comprise a coupling means. In the propulsion device 1 shown in FIG. 5, the coupling device 31 comprises a connecting rod ("conrod") and a pin, so-called pitch-link pin. The pin is a constructive embodiment of the coupling means according to the invention. In the embodiment example shown in FIG. 5, the coupling means 31 is coupled to the rotor blade 2 at the coupling point 32 not by direct connection to the rotor blade 2, but by using a connecting element 61. One end of the connecting element 61 is thereby rigidly connected to the rotor blade 2. This connection is preferably made at the rotor blade mounting point. The other end of the connecting element 61 is coupled to the coupling device/connecting rod 31. In this case, the pitch movement is introduced indirectly into the rotor blade 2 via the coupling device with the aid of the connecting rod 31 via the connecting element 61.

However, direct coupling of the coupling device 31 to the rotor blade 2 is also possible according to the invention.

Due to the fact that the coupling device 31 of the pitch mechanism is mounted eccentrically with respect to the axis of rotation of the propulsion device 1, the coupling point 32 moves relative to the rotor blade bearing axis 33 on an arc of a circle when the rotor blade 2 rotates about the axis of rotation of the propulsion device 1. This results in the pitch movement of the rotor blade 2. This is therefore a pendulum motion of the rotor blade 2 about the rotor blade bearing axis 33.

The diameter of the propulsion device 1 corresponds to twice the distance from the axis of rotation of the propulsion device 1 to the rotor blade bearing axis 33 or point. This diameter is relevant for the blade speed during rotation and therefore relevant for the generated thrust. In exemplary embodiments of the propulsion device 1 according to the invention, the diameter is in the range between 150 mm and 2000 mm, preferably between 300 mm and 500 mm, particularly preferably it is 350 mm.

Furthermore, the propulsion device 1 shown in FIG. 5 comprises a disk 11. This disk 11 is designed in such a way that it aerodynamically separates the rotor blades 2 from the remaining components of the propulsion device 1. Such a disk 11 is particularly advantageous in the event that the propulsion device 1 is operated at higher speeds.

The span of the propulsion device 1 is defined by the length of the rotor blades 2. The span of the propulsion device 1 is the (longitudinal) distance between the two disks 11.

The span of one of the cyclogyro rotors which can be used according to the invention is expediently a few centimeters to two meters, preferably between 350 to 420 mm. Advantageously, several cyclogyro rotors are used in the aircrafts according to the invention. Their span widths preferably deviate from one another by a maximum of 25%, expediently by a maximum of 10%. Their diameters preferably differ from each other by a maximum of 25%, preferably by a maximum of 10%.

The rotor blades 2 shown in FIG. 5 have a symmetrical profile; the invention is not limited to propulsion devices having rotor blades with a symmetrical profile.

The propulsion device 1 generates thrust or a thrust vector due to two coupled rotary motions. The first rotary motion is the rotation of the rotor blades 2 around the axis of rotation of the propulsion device 1. This first rotary motion results in a movement of the rotor blades 2 along a circular path around the axis of rotation of the propulsion device. Specifically, the rotor blade bearing axes 33 or rotor blade bearing points move along the circular path. Each rotor blade bearing axis 33 is parallel to the longitudinal axis of the rotor blades 2. The longitudinal axis of the rotor blades 2 is parallel to the axis of rotation of the propulsion device 1. Thus, the longitudinal axis of the rotor blades 2 is also parallel to the rotor blade bearing axis 33. The direction of thrust of the propulsion device 1 is normal to the axis of rotation of the propulsion device 1. For optimal thrust generation, all rotor blades 2 should be oriented as best as possible with respect to the direction of flow at all times. This ensures that each rotor blade 2 makes a maximum contribution to the total thrust. As the propulsion device 1 rotates about its axis of rotation, the pitch of each rotor blade 2 is continuously changed due to the pitch mechanism described above. Each rotor blade 2 performs a periodic change in pitch angle, or a reciprocating motion. This is the pitch motion. At the same time, the coupling point 32 moves on an arc around the rotor blade bearing axis 33. This is the second rotary motion.

The magnitude and direction of the generated thrust force/thrust vector depend on the pitch of the rotor blades 2. Therefore, the distance of the eccentric bearing of the offset device 4 or the pitch mechanism 3 to the axis of rotation of the propulsion device 1 influences the magnitude of the generated thrust force/thrust vector. By shifting the eccentric bearing of the offset device 4 in the circumferential direction, i.e. at a constant distance to the axis of rotation of the propulsion device 1, the direction of the generated thrust vector is changed.

Although in FIG. 5 pitch mechanisms 3 are shown only on one side of the propulsion device 1, it may be expedient for stability reasons to also attach corresponding pitch mechanisms on the opposite side of the propulsion device. For example, the pitch mechanism can also be mounted in the center of the propulsion device.

Figure 6:
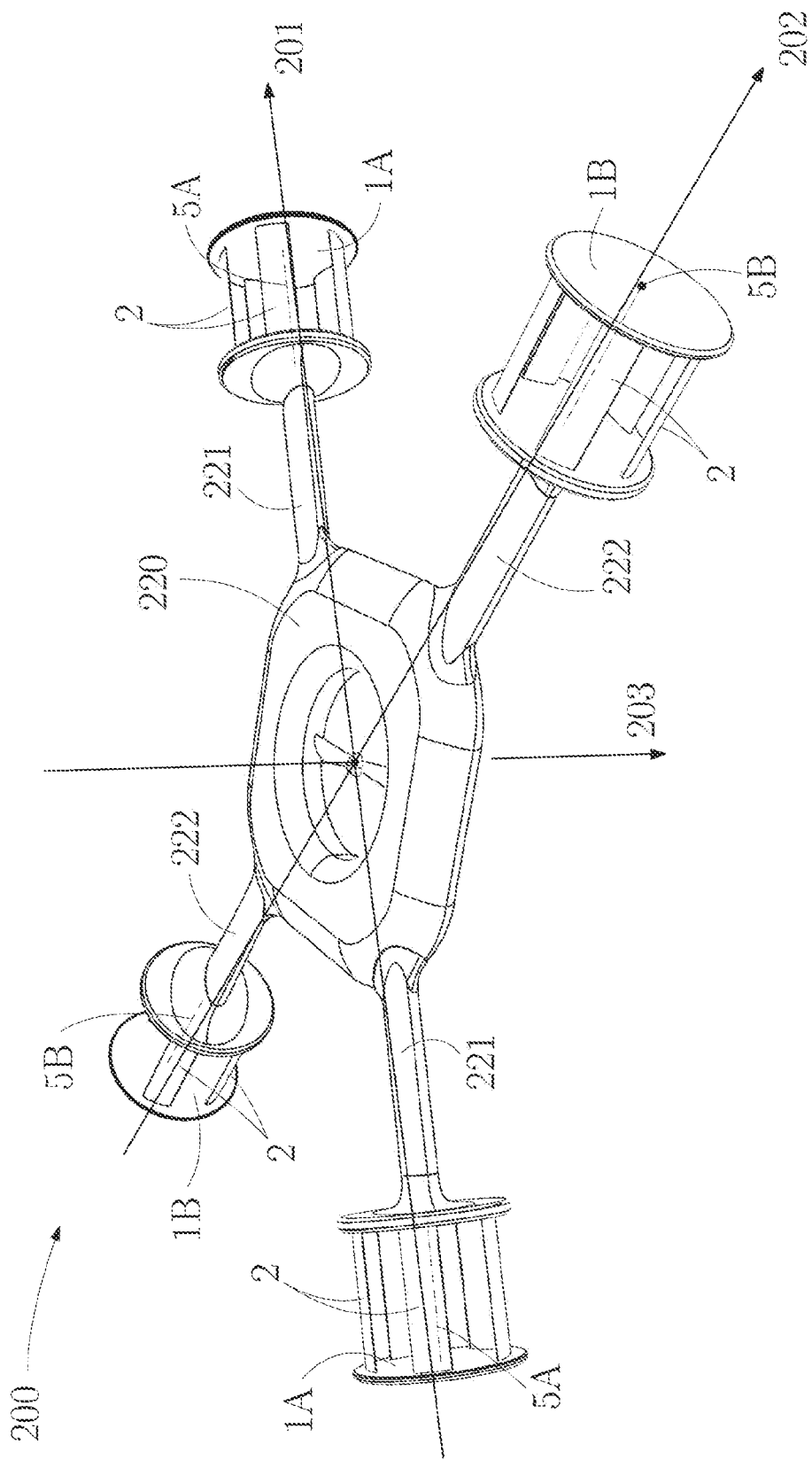
FIG. 6 is a perspective view of an aircraft according to the second aspect of the invention.

FIG. 6 shows a perspective view of an aircraft 200 in accordance with the second aspect of the invention, including an aircraft fuselage 220 and a plurality of propulsion devices 1A and 1B. Four propulsion devices 1A and 1B are shown arranged around the aircraft fuselage 220. Each propulsion device 1A and 1B is connected to the aircraft fuselage 220 via an arm 221 and 222, respectively. Each of the propulsion devices 1A and 1B may be mounted to the arms 221 and 222, respectively, with appropriate mounting or support devices. The presence of arms 221 and 222, respectively, is not essential. The propulsion devices 1A and 1B may also be otherwise coupled to the aircraft body 220. Here, the aircraft body 220 and the propulsion devices 1A and 1B lie substantially in a plane.

The depicted aircraft 200 may be, for example, an air vehicle, a manned aircraft, a drone, or so-called micro air vehicles (MAVs).

To further describe the demonstrated aircraft 200, a reference frame is introduced that defines a first direction 201, a second direction 202, and a vertical direction 203 or vertical axis. The vertical direction 203 or axis corresponds to the direction of the earth's gravitational force when the aircraft 200 is at rest on the ground. The vertical direction 203 is perpendicular to the aforementioned plane in which the aircraft fuselage 220 and the propulsion devices 1A and 1B are located. The first direction 201 and the second direction 202, or their respective axes, lie in said plane and are thus each perpendicular to the vertical direction. Essential to the aircraft 200 of the second aspect of the invention considered herein, the first direction 201 and the second direction 202 are not parallel to each other. In the embodiment shown, the first direction 201 and the second direction 202 are perpendicular to each other.

The directions thus defined shall be firmly anchored to the aircraft 200.

The aircraft 200 shown has four propulsion devices 1A and 1B. The propulsion devices 1A and 1B shown are cyclogyro rotors, respectively. A more detailed description of cyclogyro rotors has already been given in connection with FIG. 5. Each propulsion device 1A and 1B is mounted for rotation about an axis of rotation 5 associated therewith. Each propulsion device 1A and 1B includes a plurality of rotor blades 2 which are mounted for pivoting about their longitudinal axis. This allows the angle of inclination of the rotor blades 2 to be varied during rotation of the propulsion device 1A or 1B. By controlling the rotation speed (hereinafter also referred to as rotational speed) of the propulsion devices 1A and 1B, respectively, as well as the control of the tilt angle of the rotor blades 2, the magnitude as well as the direction of the generated thrust force and the thrust vector describing it, respectively, can be varied.

In FIG. 6, it can be seen that the four propulsion devices 1A and 1B essentially form the edges of a rectangle or square. At the geometric center of this rectangle or square, the fuselage 220 is positioned. Expediently, each of the propulsion devices 1A and 1B is equidistant from the center or fuselage. For this purpose, the arms 221 and 222 may have the same length. In this case, the propulsion devices 1A and 1B are positioned at the edges of a square.

The two propulsion devices 1A, corresponding to opposite edges of said rectangle or square, lie on a common straight line; in the example shown, this straight line is substantially parallel to the first direction 201; likewise, the two propulsion devices 1B, also corresponding to opposite edges of said rectangle or square, lie on a common straight line substantially parallel to the second direction 202. It should be noted that said straight lines need not necessarily be a common axis of rotation to which the propulsion devices are (rigidly) coupled. Each propulsion device 1A, 1B can rotate via its own axis of rotation 5A, 5B associated with it, and it is also possible that each of the propulsion devices 1A, 1B can be controlled individually, in particular to control their speed of rotation separately.

In the embodiment of FIG. 6, the rotational axes 5A associated with the propulsion devices 1A are substantially aligned in the first direction 201. In the embodiment example of FIG. 6, the rotational axes 5B associated with the propulsion devices 1B are substantially aligned in the first direction 202. In FIG. 6, it can be seen that the axes of rotation 5A, 5B are not aligned exactly parallel to the first direction 201 or the second direction 202. In fact, according to the invention, it is already the case when each of the associated rotation axes 5A, 5B is substantially aligned in the first direction 201 and second direction 202, respectively. According to the invention, a rotation axis 5A is substantially aligned in the first direction 201 if the angle included between the rotation axis 5A, and an axis extending in the first direction 201 and intersecting the rotation axis 5A is less than 45°, preferably less than 30°, more preferably less than 15°. Thus, the designation "substantially aligned in the first direction" does not exclude that the rotation axes 5A are also exactly parallel to the first direction 201. The same applies to the axes of rotation 5B of the second propulsion devices 1B and the second direction 202.

The aircraft 200 according to the invention is designed to perform hovering flight by each of the two propulsion devices 1A shown rotating in substantially the same direction of rotation about the respective associated axis of rotation 5A, and/or each of the two propulsion devices 1B shown rotating in substantially the same direction of rotation about the respective associated axis of rotation 5B. The design limitations resulting therefrom for the aircraft 200 will be explained in connection with the further figures, in particular FIGS. 7a and 7b.

Figure 7A:
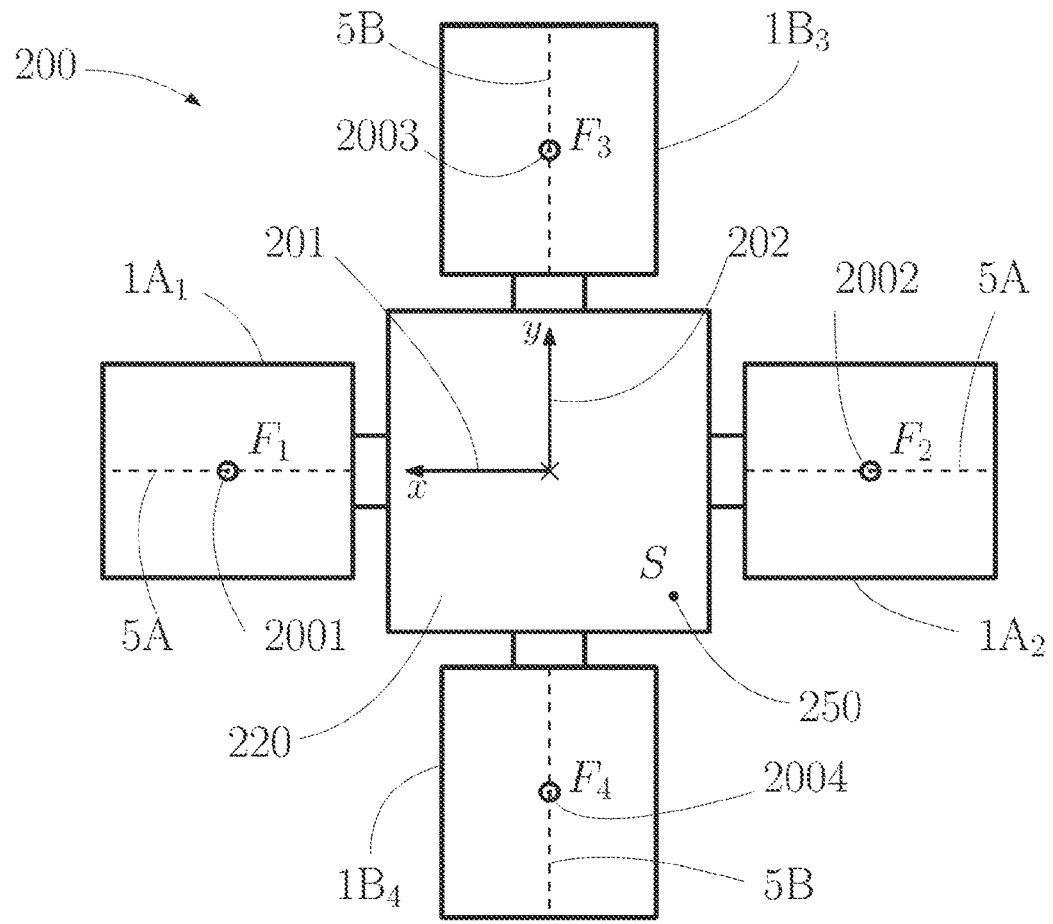
FIG. 7a is a schematic representation of the aircraft according to the second aspect of the invention in top view and the forces and torques acting thereon.

In FIG. 7a, an aircraft 200 according to the second aspect of the invention is shown in a highly schematic representation in plan view. First of all, the aircraft fuselage 220 already described in connection with FIG. 6, the propulsion devices $1A_1$, $1A_2$ and $1B_3$, $1B_4$ the axes of rotation 5A and 5B respectively associated therewith, the first direction 201 and second direction 202 can be seen; the first direction 201 is perpendicular to the second direction 202.

Figure 7B:
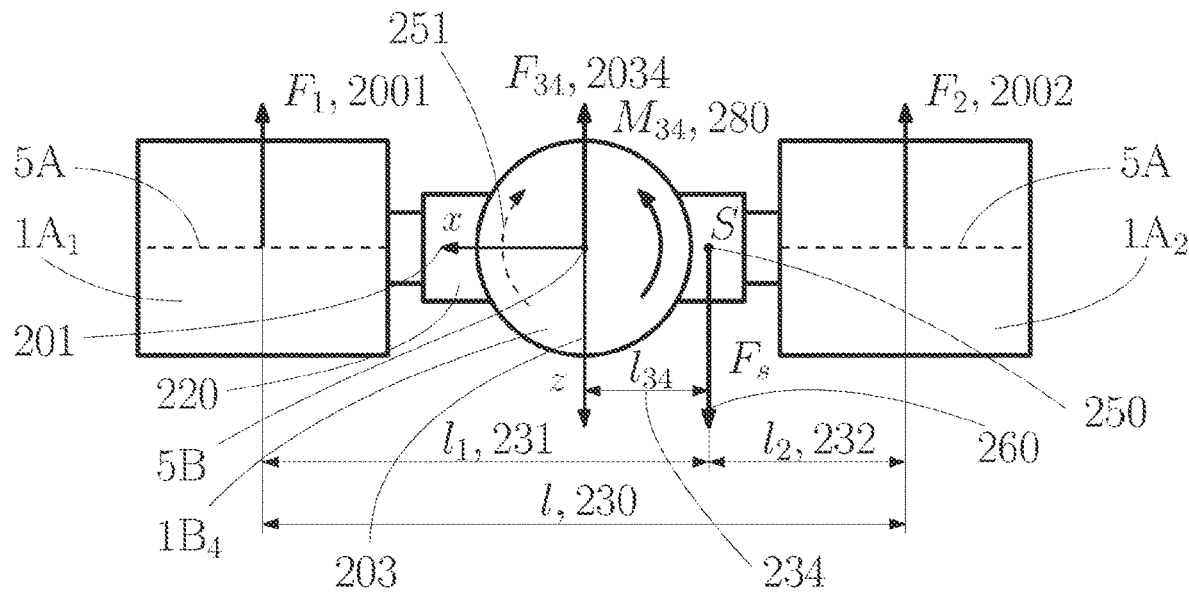
FIG. 7b is a schematic representation of the aircraft in a configuration according to the second aspect of the invention and the forces and torques acting thereon in a first side view.

To describe the mathematical-physical relationships, it is useful to introduce a (Cartesian) orthogonal coordinate system. In FIGS. 7a and 7b, a Cartesian coordinate system with x, y and z axes is used. It should be noted that, in general, the first and second directions according to the invention need not correspond to the axes of a Cartesian coordinate system. The first and second (and possibly further) directions serve to define the axes of rotation of the propulsion devices, while the (Cartesian) orthogonal coordinate system is intended to serve the purposeful mathematical description of the aircraft.

In addition, the center of mass S, 250 of the aircraft 200 is shown. The location or positioning of the center of mass S, 250 is essential for balancing the same-direction torques caused by the propulsion devices $1A_1$, $1A_2$ and $1B_3$, $1B_4$ rotating in substantially the same direction, respectively. This is described in more detail with regard to FIG. 7b. In the example shown, the center of mass S, 250 is positioned such that the aircraft 200 can take advantage of the Magnus effect both in forward flight in (positive) first direction 201

(coinciding here with the positive x-direction) and in forward flight in (positive) second direction 202 (coinciding here with the positive y-direction). When the aircraft 200 moves in the first direction 201 in forward flight, the propulsion devices $1B_3$, $1B_4$ rotate in substantially the same rotational direction about the associated rotational axes 5B, and advantageously in a clockwise direction. As defined above in connection with the first aspect, this means that the two propulsion devices $1B_3$, $1B_4$ are clockwise with respect to the second direction (y-axis) indicated in FIG. 7a. In other words, the scalar product of each of the vectors of angular velocity associated with the propulsion devices $1B_3$, $1B_4$ with the unit vector in the second direction is positive. Independent from the reference frame used, it can also be said that the propulsion devices $1B_3$, $1B_4$ rotate in such a way that the surface of the propulsion devices $1B_3$, $1B_4$, which first encounters the incident air in forward flight, rotates in the opposite direction to the direction of the earth's gravitational force. If the aircraft 200 moves in the second direction 202 in forward flight, the propulsion devices $1A_1$, $1A_2$ rotate substantially in the same direction of rotation about the associated axes of rotation 5A, and advantageously in a counterclockwise direction. The definition given above applies accordingly. In the coordinate system shown in FIG. 7a, this means that the scalar product of each of the vectors of angular velocity associated with the propulsion devices $1A_1$, $1A_2$ with the unit vector in the first direction is negative. Independent from the reference frame used, it is again true that the propulsion devices $1A_1$, $1A_2$ rotate in such a way that the surface of the propulsion devices $1A_1$, $1A_2$, which first encounters the incident air in forward flight, rotates against the direction of the earth's gravitational force.

Finally, thrust vectors $F_1$, 2001; $F_2$, 2002; $F_3$, 2003; and $F_4$, 2004 are drawn, which are generated due to the rotation of the propulsion devices about the rotation axes 5A and 5B, respectively. The thrust vectors $F_1$, 2001; $F_2$, 2002; $F_3$, 2003; and $F_4$, 2004 point out of the image plane, that is, lift is generated.

In forward flight in the first direction (x-axis), it is also possible that—with the propulsion devices $1B_3$, $1B_4$ rotating in the same direction—the propulsion devices $1A_1$, $1A_2$ rotate in opposite directions, i.e. one clockwise, the other counterclockwise. The same applies to forward flight in the second direction (y-axis). The direction of the thrust vectors $F_1$, 2001; $F_2$, 2002; $F_3$, 2003; and $F_4$, 2004 remains unaffected.

Figure 7C:
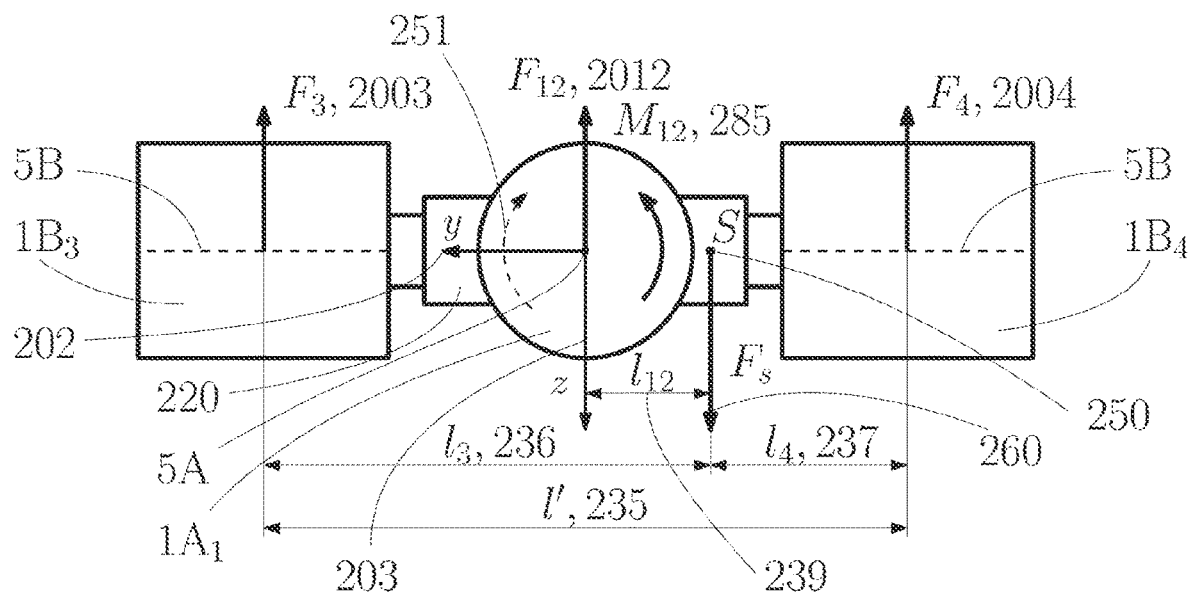
FIG. 7c is a schematic representation of the aircraft in a configuration according to the second aspect of the invention and the forces and torques acting thereon in a second side view.

FIGS. 7b and 7c show the aircraft according to the second aspect of the invention, shown in top view in FIG. 7a, in different side views and in a highly schematic view. In the side view of FIG. 7b, the two propulsion devices $1A_1$, $1A_2$ and one of the two propulsion devices $1B_3$, $1B_4$ are visible. In the side view of FIG. 7c, the two propulsion devices $1B_3$, $1B_4$ and one of the two propulsion devices $1A_1$, $1A_2$ can be seen. The rotation axes 5A associated with the propulsion devices $1A_1$, $1A_2$ are parallel to the first direction 201 (here: x-direction); the rotation axes 5B associated with the propulsion devices $1B_3$, $1B_4$ are parallel to the second direction (here: y-direction) (which points into the sheet plane).

In the considered embodiment according to the invention, the propulsion devices $1B_3$, $1B_4$ are to rotate in the same direction of rotation 251 with a certain assigned rotational speed. In FIG. 7b, the two propulsion devices $1B_3$, $1B_4$ rotate clockwise as defined above. As already explained, the rotation of each propulsion device $1B_3$, $1B_4$ generates a thrust vector. In the notation according to FIG. 7b, the thrust vector generated jointly by the two propulsion devices $1B_3$, $1B_4$ is denoted by $F_{34}$, 2034, where $F_{34}=F_3+F_4$ (cf. FIG. 7a). Because the propulsion devices $1B_3$, $1B_4$ rotate in the same direction of rotation 251, all the (drive-) torques $M_{34}$, 280 generated also act in the same direction, where here $M_{34}$, 280 denotes the (drive-) torque of both propulsion devices $1B_3$, $1B_4$, i.e. $M_{34}=M_3+M_4$.

The propulsion devices $1A_1$, $1A_2$ generate thrust vectors $F_1$, 2001; and $F_2$, 2002, respectively. The direction of rotation of the propulsion devices $1A_1$, $1A_2$ is not important in the present consideration, which concerns a design of the aircraft that is favorable for forward flight in the first direction 201. For reasons of symmetry, however, it is preferable to design the aircraft in such a way that a stable flight attitude, in particular a stable forward flight, is possible even with equally rotating propulsion devices $1A_1$, $1A_2$. This will be described further below.

With regard to FIG. 7b, momentum and balance of angular momentum theorems are applied with respect to the center of mass S, 250 of the aircraft, whereby in the case shown only the momentum theorem in the vertical direction 203 (z-axis) and the balance of angular momentum theorem around the second direction 202 (y-axis) are relevant, since forces or torques only act here.

The conditions for a stable hover flight are then:

$$\sum F_z = F_s - F_1 - F_2 - F_{34} = 0 \tag{17}$$

$$\sum M_{s,y} = F_1 * l_1 + F_{34} * l_{34} - F_2 * l_2 - M_{34} = 0. \tag{18}$$

The (magnitudes of the) thrust vectors $F_1$, $F_2$ and $F_{34}$ can be adjusted to satisfy the two equilibrium conditions. It is convenient to adjust the thrust vectors by the thrust vector control.

However, it is also possible to use the two equilibrium conditions to determine the center of mass of the aircraft in such a way that said hover conditions are satisfied for certain predetermined thrust vectors $F_1$, $F_2$, and $F_{34}$.

The torque $M_{34}$, 280 shown in FIG. 7b corresponds to the (drive-) torque of both propulsion devices $1B_3$, $1B_4$. As already explained in connection with the first aspect of the invention, there is a mathematical-physical relationship between the magnitude of the torque $M_{34}$, 280 and the magnitude of the thrust vector $F_{34}$. This is determined by equation (6) given above. Each propulsion device can have a different proportionality factor a. However, the values of a of different propulsion devices of the same design or size typically assume the same order of magnitude. Expediently, they are essentially identical.

According to equation (6), the magnitudes $M_1$, $M_2$, $M_3$, $M_4$ of the torques can be written as $$M_i = a_i * F_i, i \in \{1, 2, 3, 4\}.$$

Since in the embodiment considered, due to the parallel alignment of the axes of rotation of the propulsion devices $1B_3$, $1B_4$ with the same direction of rotation, $M_3$ and $M_4$ are parallel, the same applies in terms of magnitude:

$$|M_3 + M_4| = M_3 + M_4 = M_{34} \equiv a_{34} * F_{34}.$$

It should be mentioned here that the above equation is also valid as a good approximation for the generally considered case of axes of rotation oriented essentially in the same direction.

This results in the torque equation (18) as follows $$\sum M_{s,y} = F_1 * l_1 + F_{34} * l_{34} - F_2 * l_2 - F_{34} * a_{34} = 0.$$

Herein, $F_1$, $F_2$ denote the magnitudes of the thrust vectors $F_1$, 2001; $F_2$, 2002 generated by the propulsion devices $1A_1$ and $1A_2$, respectively; $l_1$, 231 is the distance of the thrust vector $F_1$, 2001 from the center of mass S, 250 of the aircraft, determined with respect to the first direction (where this distance $l_1$ can be identified with the distance with respect to the first direction between the center of mass S, 250 of the aircraft and the geometric center along the axis of rotation 5A of the propulsion device $1A_1$; in other words: $l_1$ is the distance with respect to the first direction from the center of mass S, 250 of the aircraft to the half span of the propulsion device $1A_1$); $l_2$,232 is the distance of the thrust vector $F_2$, 2002 from the center of mass S, 250 of the aircraft, determined with respect to the first direction (where this distance $l_2$ can be identified with the distance with respect to the first direction between the center of mass S, 250 of the aircraft and the geometric center of the propulsion device $1A_2$ along the axis of rotation 5A; in other words: $l_2$ is the distance with respect to the first direction from the center of mass S, 250 of the aircraft to the half span of the propulsion device $1A_2$); $F_{34}$ is the magnitude of the thrust vector $F_{34}=F_3+F_4$, 2034 generated by both propulsion devices $1B_3$ and $1B_4$; $l_{34}$, 234 is the distance, determined with respect to the first direction, between the center of mass S, 250 of the aircraft, on the one hand, and the thrust vector $F_{34}$, 2034 or, equivalently, the axes of rotation of the propulsion devices $1B_3$ and $1B_4$ or, equivalently, the straight line passing through the propulsion devices $1B_3$ and $1B_4$, on the other hand (it being assumed here that the propulsion devices $1B_3$ and $1B_4$ lie on a straight line which is—at least approximately—parallel to the second direction); $a_{34}$ is the proportionality factor assigned to the propulsion devices $1B_3$ and $1B_4$.

This equation can now be transformed into a ratio of the magnitudes $F_1$ and $F_2$ of the two thrust vectors $F_1$, 2001 and $F_2$, 2002, respectively:

$$\frac{F_1}{F_2} = \frac{l_2}{l_1} + \frac{F_{34}}{F_2} * \frac{a_{34} - l_{34}}{l_1}. \tag{19}$$

Equation (19) can serve as a configuration formula for the aircraft. Equation (19) initially contains four freely selectable quantities (from the set of $F_1$, $F_2$, $F_{34}$, $l_1$, $l_2$, $l_{34}$), however, equation (17) still has to be considered in a stable flight attitude, which is why only three of the aforementioned four quantities can be freely selected.

A corresponding configuration formula is also obtained for the case where the momentum theorem is established in the vertical direction 203 (z-axis) and the balance of angular momentum theorem is established about the first direction 201 (x-axis). For this purpose, reference is made to FIG. 7c. Such a consideration is necessary if one wants to use the effect according to the invention, i.e. in particular the positive contribution of the Magnus effect, also for forward flight in the second direction (y-axis).

The conditions for a stable hover flight are then:

$$\sum F_z = F_s - F_3 - F_4 - F_{12} = 0 \tag{20}$$

$$\sum M_{s,x} = F_3 * l_3 + F_{12} * l_{12} - F_4 * l_4 - M_{12} = 0. \tag{21}$$

The terms apply as in the case of equations (17) and (18), but with the indices shifted: $1 \rightarrow 3$; $2 \rightarrow 4$; $3 \rightarrow 1$; $4 \rightarrow 2$. Therefore, we do not repeat the individual expressions. In particular, $M_{12}$, 285, is the total torque generated by the propulsion devices $1A_1$, $1A_2$.

Considering the remarks related to equations (17) and (18) with respect to equation (6), the torque equation (21) can be written as:

$$\sum M_{s,x} = F_3 * l_3 + F_{12} * l_{12} - F_4 * l_4 - F_{12} * a_{12} = 0.$$

Herein, $F_3$, $F_4$ denote the magnitudes of the thrust vectors $F_3$, 2003; $F_4$, 2004 generated by the propulsion devices $1B_3$ and $1B_4$, respectively (cf. FIG. 7a); $l_3$, 236, the distance of the thrust vector $F_3$ from the center of mass S, 250 of the aircraft determined with respect to the second direction (where this distance $l_3$ can be identified with the distance with respect to the second direction between the center of mass S, 250 of the aircraft and the geometric center of the propulsion device $1B_3$ along the axis of rotation 5B; in other words: $l_3$ is the distance with respect to the second direction from the center of mass S, 250 of the aircraft to the half span of the propulsion device $1B_3$); $l_4$, 237, the distance of the thrust vector $F_4$ from the center of mass S, 250 of the aircraft, determined with respect to the second direction (where this distance $l_4$ can be identified with the distance in the second direction between the center of mass S, 250 of the aircraft and the geometric center of the propulsion device $1B_4$ along the axis of rotation 5B; in other words: $l_4$ is the distance, with respect to the second direction, from the center of mass S, 250 of the aircraft to the half span of the propulsion device $1B_4$); $F_{12}$ is the magnitude of the thrust vector $F_{12}=F_1+F_2$, 2012, generated by both propulsion devices $1A_1$ and $1A_2$; $l_{12}$, 239, is the distance, determined with respect to the second direction, between the center of mass S, 250 of the aircraft, on the one hand, and the thrust vector $F_{12}$, 2012, or equivalently, the axes of rotation of the propulsion devices $1A_1$ and $1A_2$, or equivalently, the straight line passing through the propulsion devices $1A_1$ and $1A_2$, on the other hand (it being assumed here that the propulsion devices $1A_1$ and $1A_1$ lie on a straight line which is—at least approximately—parallel to the first direction); $a_{12}$ is the proportionality factor assigned to the propulsion devices $1A_1$ and $1A_2$.

This equation can now be transformed into a ratio of the magnitudes $F_3$ and $F_4$ of the two thrust vectors $F_3$ and $F_4$, respectively:

$$\frac{F_3}{F_4} = \frac{l_4}{l_3} + \frac{F_{12}}{F_4} * \frac{a_{12} - l_{12}}{l_3}. \tag{22}$$

Due to the topology of the star-shaped arrangement of the propulsion devices $1A_1$, $1A_2$, $1B_3$ and $1B_4$, it is convenient if one pair of propulsion devices $1A_1$, $1A_2$ or $1B_3$, $1B_4$ generates half of the required thrust in each case. This results in the boundary condition $$F_{12} = F_{34}. \qquad (23)$$

It should be noted that this does not necessarily imply that all thrust vectors $F_1$, $F_2$, $F_3$, and $F_4$ must be the same; it is sufficient if the sum of the thrust vectors of two opposite propulsion devices is the same. However, all thrust vectors $F_1$, $F_2$, $F_3$, and $F_4$ can also be individually different.

Another useful boundary condition arises when it is required that the propulsion devices are preferably centrally mounted on the aircraft fuselage 220. That is, the following shall apply $$l_{34} = \frac{l}{2} - l_2 = \frac{l_1 - l_2}{2} = l_1 - \frac{l}{2}, \qquad (24a)$$

$$l_{12} = \frac{l'}{2} - l_4 = \frac{l_3 - l_4}{2} = l_3 - \frac{l'}{2}, \qquad (24b)$$

where for the distance l, 230 of the thrust vectors and the geometric centers of the propulsion devices $1A_1$, $1A_2$ was used, respectively: $l=l_3+l_4$, and for the distance l', 235, of the thrust vectors or of the geometric centers of the propulsion devices $1B_3$, $1B_4$: $l'=l_1+l_2$. Expediently $l'=l$.

These boundary conditions (23) and (24a) lead to the following configuration formula:

$$\frac{F_1}{F_2} = \frac{l_2}{l_1} + \left(\frac{F_1}{F_2} + 1\right) * \frac{2*a_{34} - l_1 + l_2}{2*l_1}, \qquad (25a)$$

the boundary conditions (23) and (24b) lead to:

$$\frac{F_3}{F_4} = \frac{l_4}{l_3} + \left(\frac{F_3}{F_4} + 1\right) * \frac{2*a_{12} - l_3 + l_4}{2*l_3}. \qquad (25b)$$

It is convenient to assume that the proportionality factors are equal, $a_{12}=a_{34}\equiv a$.

Here, the next step is to determine the number of freely presettable thrust vectors using equations (17), (18), (20) and (21). If we assume that the positions of the propulsion devices are fixed, we have the following unknowns in the said equations: $F_1$, $F_2$, $F_3$, $F_4$, $l_{12}$ and $l_{34}$. Further, it must be noted that equations (17) and (20) give the identical constraint. Thus one has three equations for six unknowns. The center of mass is to be determined by means of $l_{12}$ and $l_{34}$ so that equations (17), (18), (20) and (21) specify a thrust vector; three of the four thrust vectors $F_1$, $F_2$, $F_3$ can be specified as desired. If further boundary conditions are taken into account, the number of freely definable thrust vectors is reduced accordingly.

There are several ways to satisfy equations (17), (20), (25a), (25b).
 (i) In a first case design, it may be required that the aircraft is symmetrically designed. That is, the center of mass S, 250 is exactly midway between the (centers of mass of the) propulsion devices $1A_1$, $1A_2$ and/or $1B_3$, $1B_4$. In this case $l_1=l_2$ and/or $l_3=l_4$. From equations (25a), (25b) then it results $$F_1 = F_2 * \frac{a_{34} + l_1}{l_1 - a_{34}}, \text{ and/or}$$

$$F_3 = F_4 * \frac{a_{12} + l_3}{l_3 - a_{12}}.$$

Because of $$\frac{l + a}{l - a} > 1$$

it follows that the propulsion device $1A_1$, $1B_3$, arranged in positive first direction or positive second direction, respectively, must generate more thrust than the propulsion device $1A_2$, $1B_4$, arranged in negative first direction or negative first direction, respectively, thus $F_1 > F_2$ and/or $F_3 > F_4$. Thus, the propulsion devices arranged in positive direction must be designed larger than the propulsion devices arranged in negative direction. In other words, the propulsion devices arranged in the front in the forward flight direction must be designed larger than the propulsion devices arranged in the rear.

In this case design, the center of mass S, 250 will therefore tend to move in the positive first and/or second direction, which will result in $l_1 < l_2$ and/or $l_3 < l_4$, and the difference in the required thrust vectors $F_1$ and $F_2$ or $F_3$ and $F_4$ of the propulsion devices $1A_1$, $1A_2$ or $1B_3$, $1B_4$ further increases.
 (ii) In a second case design, the two propulsion devices $1A_1$, $1A_2$ are particularly preferably identically designed in terms of construction and/or the two propulsion devices $1B_3$, $1B_4$ are identically designed in terms of construction. That is, they are structurally identical and have, for example, the same size, the same span, the same number of rotor blades and/or generate similar or the same (maximum) thrust forces/thrust vectors. In this case, therefore, $F_1=F_2$ (or $F_1 \approx F_2$) and/or $F_3=F_4$ (or $F_3 \approx F_4$).

From equations (25a) and (25b) it then follows $$l_1 = \frac{l}{2} + \frac{a_{34}}{2}, \qquad (26a)$$

$$l_3 = \frac{l'}{2} + \frac{a_{12}}{2}. \qquad (26b)$$

It is recognized that the center of mass S, 250 of the aircraft is shifted along the first direction 201 and/or second direction from the (geometric) center l/2 between respectively opposite propulsion devices $1A_1$, $1A_2$ and $1B_3$, $1B_4$ towards the rear propulsion devices $1A_2$, $1B_4$ with respect to the forward flight direction, according to equations (24a) and (24b), respectively, by $$l_{34} = l_1 - \frac{l}{2} = \frac{a_{34}}{2}, \qquad (27a)$$

$$l_{12} = l_3 - \frac{l'}{2} = \frac{a_{12}}{2}. \qquad (27b)$$

If an aircraft is now configured with structurally identical, equally sized propulsion devices $1A_1$, $1A_2$ and/or $1B_3$, $1B_4$ and thus approximately equally sized thrust forces/thrust vectors per pair of propulsion devices $1A_1$, $1A_2$ or $1B_3$, $1B_4$, the center of mass S, 250 can thus optimally be positioned such that the torques generated by the propulsion devices are balanced purely by the position of the center of mass S, 250. Said optimal position is determined by equations (27a) and/or (27b).

It must be noted here and in the following that only the position of the center of mass in the first direction 201 plays a role for the considerations concerning the equally rotating propulsion devices $1B_3$, $1B_4$. The bearing or positioning of the center of mass with respect to the second direction and vertical direction 203 is not relevant here and is at the discretion of the person skilled in the art. Accordingly, it applies that only the position of the center of mass in the second direction plays a role for the considerations concerning the equally rotating propulsion devices $1A_1$, $1A_2$. The bearing or positioning of the center of mass with respect to the first direction 201 and vertical direction 203 is not relevant in this case. If, however, the aircraft is to take advantage of the positive effect of the Magnus effect both when moving forward in the first direction and when moving forward in the second direction, the optimum position of the center of mass is determined by both equations (27a) and (27b), so that only its positioning with respect to the vertical direction 203 remains freely selectable.

(iii) According to the invention, it is also possible that aspects of the first case design (i) and the second case design (ii) are combined. That is, the center of mass S, 250 of the aircraft can be displaced from the geometric center of the aircraft fuselage 220 in such a way that the conditions (17), (20), (25a), (25b) for stable hovering flight at certain predetermined, even different, thrust vectors/thrust forces of individual ones of the propulsion devices are fulfilled.

For practical applications, it is not always possible to place the masses in an aircraft in such a way that the overall center of mass S, 250 can be positioned exactly at the predetermined optimum position described in (i), (ii), or (iii) (for case design (i) is $l_1=l_2$ and/or $l_3=l_4$; for case design (ii) see equations (26a), (26b), (27a), (27b)). Therefore, a range is defined below in which the center of mass S, 250 can be located so that it is still possible to support torque compensation with the thrust forces/thrust vectors $F_1$, 2001, $F_2$, 2002 of the pairs of propulsion devices $1A_1$, $1A_2$ and torque compensation with the thrust forces/thrust vectors $F_3$, 2003, $F_4$, 2004 of the pairs of propulsion devices $1B_3$, $1B_4$, respectively.

For this purpose, it is first assumed that one of the propulsion devices $1A_1$, $1A_2$, $1B_3$, $1B_4$ can generate a maximum permissible (usually predetermined) thrust force/maximum permissible thrust vector of $F_{i,max}$. It is assumed that $F_{i,max}$ are greater than or equal to the thrust forces corresponding to the optimum configuration $F_{i,opt}$ (as also already described in more detail in connection with the first aspect of the invention).

Taking into account the momentum theorem according to equation (17), the following results at first $$F_{1,opt} \le F_{1,max} \Rightarrow F_{2,opt} \ge F_{2,min} \equiv F_s - F_{1,max} - F_{34,opt}$$

and thus a maximum permissible thrust vector ratio of $$R_{max} = \frac{F_{1,max}}{F_{2,min}}.$$

For the case $$F_{2,opt} \le F_{2,max} \Rightarrow F_{1,opt} \ge F_{1,min} \equiv F_s - F_{2,max} - F_{34,opt}$$

This results in a minimum permissible thrust vector ratio of $$R_{min} = \frac{F_{1,min}}{F_{2,max}}.$$

Using the boundary condition of equation (23), $F_{12}=F_{34}$, in equations (17) and (20), we obtain $$F_{12} = F_{34} = \frac{F_s}{2}.$$

These thrust vector ratios $F_1/F_2$ are also described by equation (25a); using the latter, the maximum permissible distance in the first direction 201 of the center of mass S, 250 from the geometric center of the forward propulsion device $1A_1$ in forward flight, can be calculated to be $$l_{1_{max}} = \frac{(R_{min} + 3)*l + (R_{min} + 1)*2*a_{34}}{(R_{min} + 1)*4}$$

and the minimum permissible distance in the first direction 201 of the center of mass S, 250 from the geometric center of the forward propulsion device $1A_1$ in forward flight to $$l_{1_{min}} = \frac{(R_{max} + 3)*l + (R_{max} + 1)*2*a_{34}}{(R_{max} + 1)*4}$$

If the center of mass S, 250 with respect to the first direction 201 lies outside the range $$l_{1_{min}} \le l_1 \le l_{1_{max}}, \tag{28}$$

it is no longer possible to compensate for the deviation of the center of mass S, 250 from the optimum position according to equation (26a) by the thrust forces $F_1$, 2001 or $F_2$, 2002 of the propulsion devices $1A_1$, $1A_2$.

By means of equation (24a), the permissible range (28) in the first direction can also be specified with respect to the axes of rotation of the propulsion devices $1B_3$, $1B_4$ or the straight line that runs through the propulsion devices $1B_3$, $1B_4$. Then the specification of the range is done with the help of the distance $l_{34}$ and corresponding limits $l_{34,min}$ and $l_{34,max}$.

Analogously, for the permissible range of the center of mass S, 250 with respect to the second direction (here: y-direction), we obtain $$l_{3_{min}} \le l_3 \le l_{3_{max}}, \tag{29}$$

where $$l_{3_{max}} = \frac{(R'_{min} + 3)*l' + (R'_{min} + 1)*2*a_{12}}{(R'_{min} + 1)*4},$$

-continued
$$l_{3_{min}} = \frac{(R'_{max}+3)*l' + (R'_{max}+1)*2*a_{12}}{(R'_{max}+1)*4},$$

with $$R'_{min} = \frac{F_{3,min}}{F_{4,max}},$$

$$R'_{max} = \frac{F_{3,max}}{F_{4,min}}$$

By means of equation (24b), the permissible range (29) in the second direction can also be specified with respect to the axes of rotation of the propulsion devices $1A_1$, $1A_2$ or the straight line running through the propulsion devices $1A_1$, $1A_2$. Then the specification of the range is done with the help of the distance $l_{12}$ and corresponding limits $l_{12,min}$ and $l_{12,max}$.

Figure 7D:
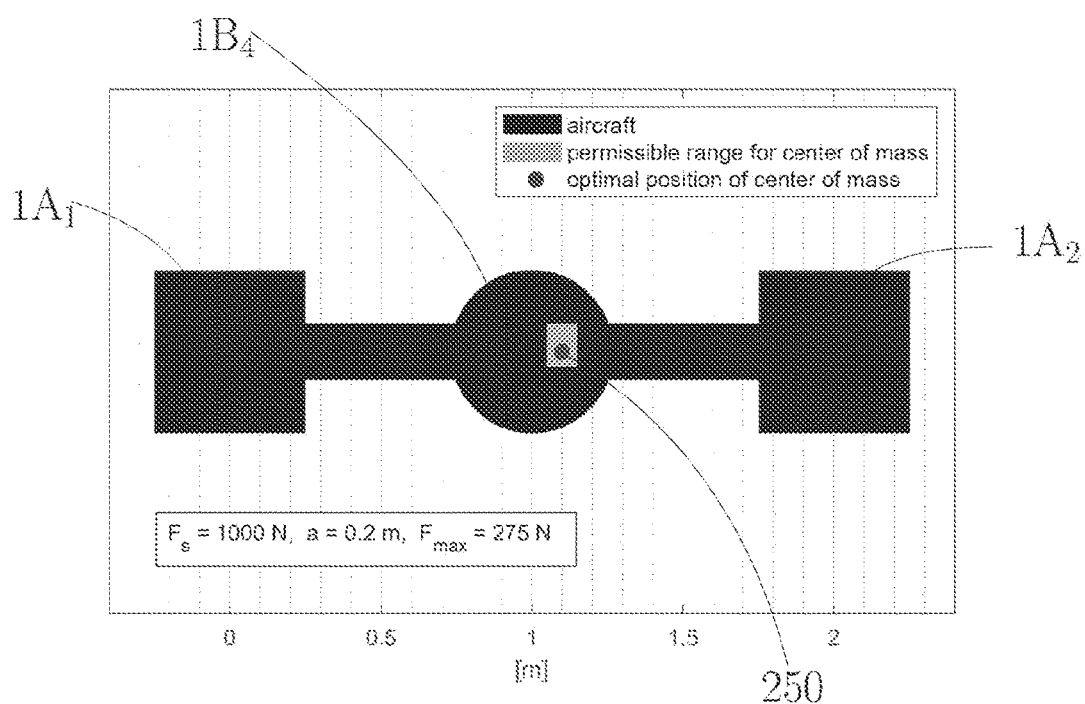
FIG. 7d is an example configuration of an aircraft according to the second aspect of the invention with four propulsion devices arranged in a star configuration and of equal size to illustrate the preferred center of mass position of the aircraft.

FIG. 7d serves to illustrate the above-described range in which the center of mass S, 250 of the aircraft may suitably be located for implementing the invention according to the second aspect. FIG. 7d schematically illustrates an aircraft with propulsion devices $1A_1$, $1A_2$ and $1B_3$, $1B_4$, corresponding to that described in connection with FIGS. 7a and 7b. It is further assumed that the propulsion devices $1A_1$, $1A_2$, $1B_3$, $1B_4$ are identically designed in terms of construction (see case design (ii) above), here in particular: $a_1=a_2=a_3=a_4=a_{12}=a_{34}\equiv a$.

First, it is further assumed that the torque compensation is to be realized purely via the position of the center of mass S, 250, whereby $$F_{1,opt} = F_{2,opt} = F_{opt} \Rightarrow M_{1,opt} = M_{2,opt} = M_{opt}$$

applies. For the example of the aircraft considered here, a total weight force generated by a corresponding total mass of $$F_s=1000 \text{ N}$$

Is assumed; the ratio/proportionality factor is typically $$a=0.2m;$$

the distance of the propulsion devices in the first direction (in FIGS. 7a, 7b: x-direction) is defined as $$l = l_1 + l_2 = 2 \text{ m}.$$

Based on these specifications, equations (25a) and (26a) give an optimum center-of-mass position of $$R_{opt} = 1 = \frac{F_{1,opt}}{F_{2,opt}} = \frac{l_{2,opt}}{l_{1,opt}} + (1+1)\frac{2*a - l_{1,opt} + l_{2,opt}}{2*l_{1,opt}} \Rightarrow l_{1,opt} = \frac{l}{2} + \frac{a}{2} =$$

$$1.1 \text{ m} \Rightarrow l_{2,opt} = \frac{l}{2} - \frac{a}{2} = 0.9 \text{ m}.$$

If it is not possible to place the overall center of mass S, 250 of the aircraft at the position $l_{1,opt}=1.1$ m a range is now defined in which the position of the center of mass S, 250 can be located so that the torque compensation can be compensated by the thrust forces/thrust vectors of the propulsion devices $1A_1$, $1A_2$, $1B_3$, $1B_4$. For this purpose, the maximum allowable thrust force that can be generated by each of the propulsion devices $1A_1$, $1A_2$ arranged in the first direction, which is expediently controlled by from the thrust vector control, is defined as $$F_{1,max} = F_{2,max} = 275\text{N}.$$

By this specification and using the boundary condition according to equation (23), $$F_{34} = \frac{F_s}{2} = 500\text{N},$$

the maximum and minimum permissible thrust vector ratio $$R_{max} = \frac{F_{1,max}}{F_{2,min}} = \frac{11}{9}$$

$$R_{min} = \frac{F_{1,min}}{F_{2,max}} = \frac{9}{11}$$

and the range for the position of the center of mass according to equation (28)

$$l_{1_{max}} = \frac{(R_{min}+3)*l + (R_{min}+1)*2*a}{(R_{min}+1)*4} = 1.15 \text{ m}$$

$$l_{1_{min}} = \frac{(R_{max}+3)*l + (R_{max}+1)*2*a}{(R_{max}+1)*4} = 1.05 \text{ m}$$

$$1.05 \text{ m} \le l_1 \le 1.15 \text{ m}$$

can be calculated. That is, in this example, the center of mass with respect to the first direction is expediently located 1.05 to 1.15 m from the geometric center of the two propulsion devices $1A_1$ with respect to the forward flight direction. Using equation (27a), this result can also be expressed as follows: the center of mass is expediently located 0.05 to 0.15 m away from the axis of rotation of the propulsion devices $1B_3$, $1B_4$ or the straight line passing through the two propulsion devices $1B_3$, $1B_4$ with respect to the first direction.

Assuming that the aircraft is symmetrically designed, the same values are obtained for the permissible range of $l_3$. If both conditions are taken into account, the center of mass S, 250 is suitably positioned with respect to the plane defined by the propulsion devices and the aircraft fuselage in a square area determined by the specified limits. The positioning with respect to the vertical direction is not limited.

Finally, it is further stated that the second aspect according to the invention is not limited to aircrafts with four propulsion devices. It is also possible, for example, that more than two propulsion devices are arranged along one direction, or also that some propulsion devices are arranged on mutually parallel straight lines.

Figure 8A:
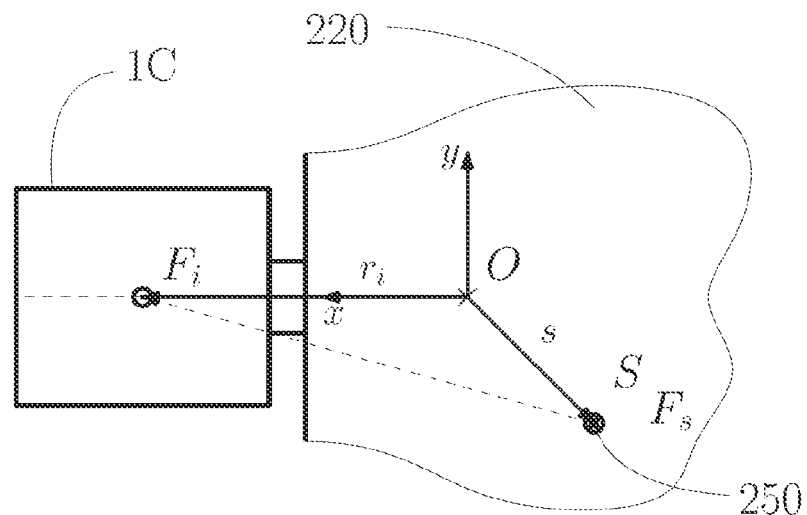
FIG. 8a is a section of an aircraft with n propulsion devices according to the second aspect of the invention in top view to explain the determination of the center of mass.
Figure 8B:
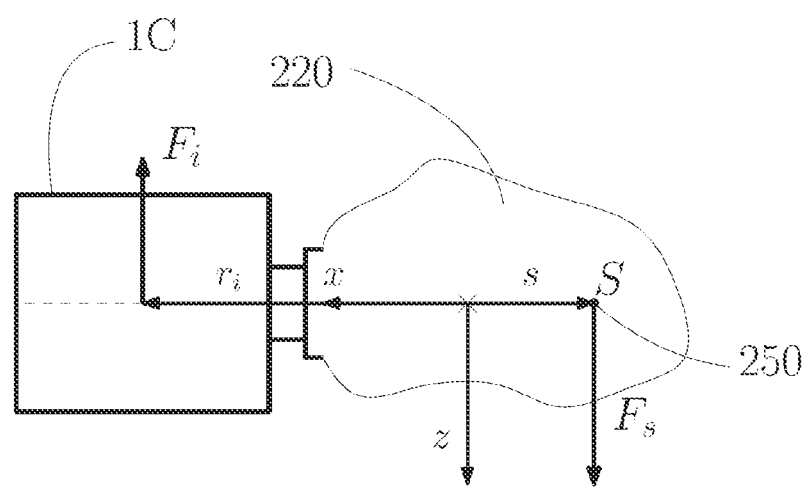
FIG. 8b is a section of the aircraft with n propulsion devices in side view.

Equations (17), (18), (20), (21) are now generalized for an aircraft according to the invention with n, n>2, propulsion devices 1C. FIG. 8a shows a section of such an aircraft in plan view; FIG. 8b a section of the aircraft in side view. We assume that the mathematical-physical description of the aircraft is done in a Cartesian coordinate system with x-, y- and z-axis. The n propulsion devices 1C and the aircraft fuselage 220 are located in the xy-plane, i.e. in the plane with z=0. The propulsion devices 1C are arranged around the aircraft fuselage 220 (star-shaped) in the plane z=0. Let the origin O of the coordinate system be at the geometric center of the aircraft. Then let $r_i$, $i \in \{1, \ldots, n\}$ be the position vectors to the i-th thrust vector of the corresponding propulsion devices 1C. Let's be the position vector to the center of mass S, 250 of the aircraft. The vector of the weight force of the aircraft is $F_s=(0, 0, F_s)$. In the case of stable hovering flight of interest here, the thrust vectors are $F_i$, $i \in \{1, \ldots, n\}$ generated by the propulsion devices:

$$F_i = (0, 0, -F_i), \quad i \in \{1, \ldots, n\}.$$

Finally, in hover flight, the propulsion devices rotate with the angular velocity $\omega_i$, $i \in \{1, \ldots, n\}$ where we are dealing here with vectors lying in the xy-plane. The torque, already described in detail in the introduction, which has to be applied by the aircraft, can then be calculated under consideration of the relation $M_i = a_i * F_i$:

$$M_i = a_i * |F_i| * \left(-\frac{\omega_i}{|\omega_i|}\right), \quad i \in \{1, \ldots, n\}. \tag{30}$$

The equilibrium conditions of equations (17), (18), (20), (21) are then:

$$\sum F_z = F_s - \sum_{i=1}^{n} F_i = 0 \tag{31}$$

$$\sum M_s = \sum_{i=1}^{n} (r_i - s) \times F_i + \sum_{i=1}^{n} M_i = 0. \tag{32}$$

"×" denotes the cross product.

From the balance of angular momentum theorem, the position vector s of the center of gravity S, 250 can be determined as follows: With $$\sum_{i=1}^{n} (r_i - s) \times F_i = -\sum_{i=1}^{n} M_i,$$

$$\sum_{i=1}^{n} F_i \times ((r_i - s) \times F_i) = -\sum_{i=1}^{n} F_i \times M_i,$$

using the Graßmann identity:

$$\sum_{i=1}^{n} (F_i \cdot F_i) * (r_i - s) - (F_i \cdot (r_i - s)) * F_i = -\sum_{i=1}^{n} F_i \times M_i,$$

and taking into account that $F_i$ is always normal to $(r_i - s)$ whereby their scalar product is zero:

$$F_i \cdot (r_i - s) = 0 \Rightarrow (F_i \cdot (r_i - s)) * F_i = 0,$$

we first get $$\sum_{i=1}^{n} (F_i \cdot F_i) * (r_i - s) = -\sum_{i=1}^{n} F_i \times M_i,$$

-continued $$\sum_{i=1}^{n} (F_i \cdot F_i) * r_i - (F_i \cdot F_i) * s = -\sum_{i=1}^{n} F_i \times M_i,$$

$$\sum_{i=1}^{n} (F_i \cdot F_i) * r_i - s * \sum_{i=1}^{n} (F_i \cdot F_i) = -\sum_{i=1}^{n} F_i \times M_i,$$

and finally the position vector s of the center of gravity S, 250:

$$s = \frac{\sum_{i=1}^{n} (F_i \cdot F_i) * r_i + F_i \times M_i}{\sum_{i=1}^{n} (F_i \cdot F_i)}. \tag{33}$$

Equation (32) provides two conditions, one for the x-components of the torques, and another for their y-components. Equations (31) and (32) (considering the relation of equation (30)) thus provide three conditions for the magnitudes $F_i$ of the n thrust vectors and the two coordinates of the center of gravity. This leaves n+2−3=n−1 of the n thrust vectors that can be specified. An expedient range with respect to the plane in which the propulsion devices 1C and the aircraft fuselage 220 lie can thus also be determined in the more general case considered here by varying the thrust vectors of one or more of the n propulsion devices 1C, and requiring that the center of mass S, 250 be positioned (cf. equation (33)) such that the torque compensation according to equation (32) can be compensated by the thrust forces/thrust vectors of the propulsion devices. For this purpose, it may be useful to drive one or more of the propulsion devices with maximum permissible thrust.

In that the optimum position of the center of mass in the configuration under consideration is determined by the intersection of two straight lines, it is convenient to consider the first direction and/or the second direction, along which the propulsion devices rotate in substantially the same direction, as the directions perpendicular to two predetermined forward flight directions. In this case, the center of mass is thus preferably shifted out of the geometric center (i) with respect to a direction perpendicular to the first direction and lying in the plane defined by the propulsion devices and the aircraft fuselage, and/or (ii) with respect to a direction perpendicular to the second direction and lying in the plane defined by the propulsion devices and the aircraft fuselage.

Figure 9A:
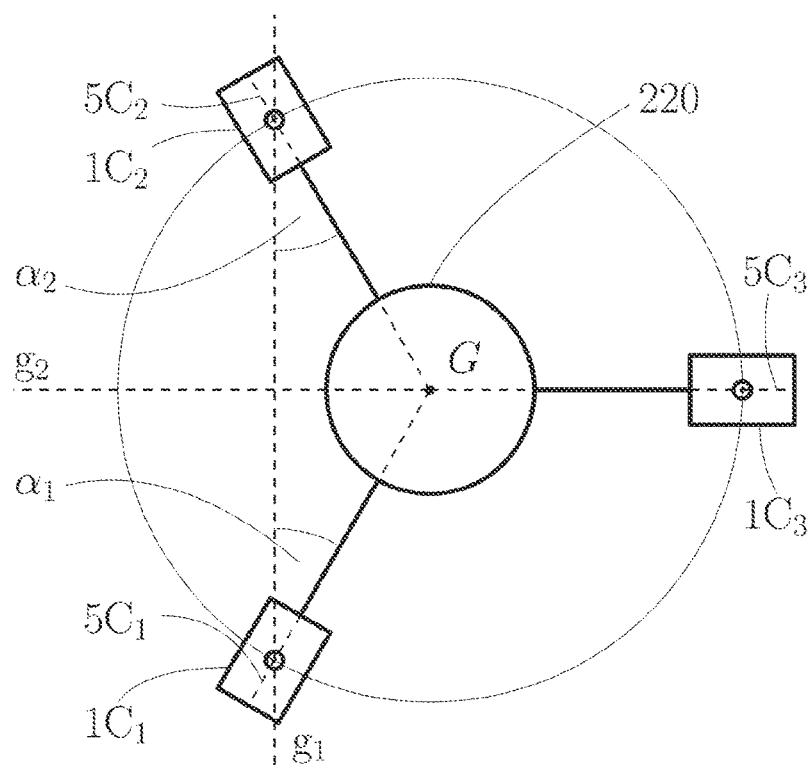
FIG. 9a is a schematic representation of an aircraft according to the second aspect of the invention with three propulsion devices.

FIG. 9a shows an embodiment according to the second aspect of the invention, in which three propulsion devices $1C_1$, $1C_2$, $1C_3$ are arranged around the aircraft fuselage 220 of the aircraft in such a way that they form the edges of an equilateral triangle. It is shown that the propulsion devices $1C_1$ and $1C_2$ are arranged on a straight $g_1$; $g_1$ thereby defining the first direction according to the invention. In the embodiment shown, the propulsion device $1C_3$ is arranged on a straight line $g_2$, which is perpendicular to the straight line $g_1$ and passes through the geometric center G of the aircraft, in this case through the geometric center G of the equilateral triangle. The straight line $g_2$ defines the second direction according to the invention. The axes of rotation $5C_1$, $5C_2$, $5C_3$ of the propulsion devices $1C_1$, $1C_2$ and $1C_3$ respectively point towards (or away from) the geometric center G here. In the embodiment shown, only the rotational axis $5C_3$ is aligned exactly parallel to the second direction defined by $g_2$. The rotational axes $5C_1$, $5C_2$ are not exactly parallel to the first direction defined by $g_1$. As can be seen with the aid of simple geometric considerations, the rotational axis $5C_1$ includes an angle $\alpha_1=30°$ with the straight line $g_1$ (first direction); similarly, the rotational axis $5C_2$ includes an angle $\alpha_2=30°$ with the straight line $g_1$ (first direction). Such angles fall within the notion of rotary axes substantially aligned in the first direction according to the invention. Preferably, however, the angles can also be chosen to be smaller. If the propulsion devices $1C_1$, $1C_2$ rotate about these axes of rotation substantially in the same direction of rotation as defined above, the success according to the invention still occurs here when the aircraft moves in particular along the second direction defined by $g_2$. If the propulsion devices $1C_1$, $1C_3$ rotate about the associated axes of rotation $5C_1$ and $5C_3$, respectively, essentially in the same direction of rotation, the advantage according to the invention has a positive effect, in particular, when the aircraft moves along the angle bisector $1C_1$-G-$1C_3$.

Figure 9B:
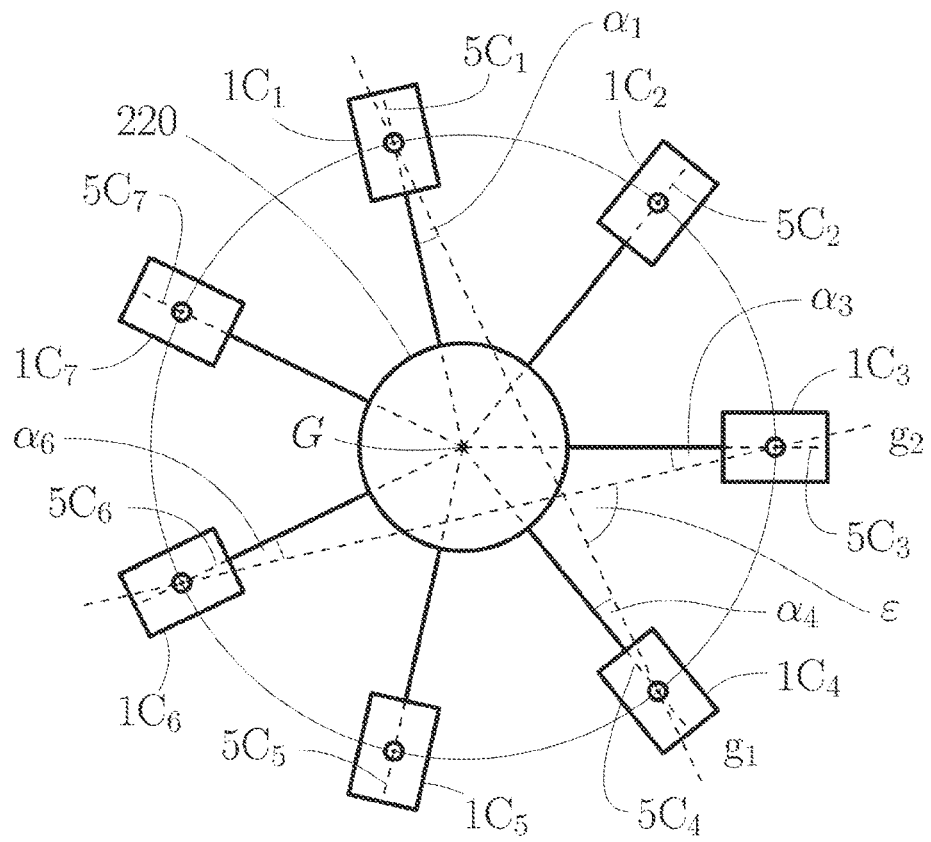
FIG. 9b is a schematic representation of an aircraft according to the second aspect of the invention with seven propulsion devices.

FIG. 9b shows an aircraft according to the second aspect of the invention, in which seven propulsion devices $1C_1$, . . . , $1C_7$ are arranged in a plane around the aircraft fuselage 220. The propulsion devices $1C_1$, . . . , $1C_7$ are arranged to form the vertices of a regular heptagon. Each of the propulsion devices is rotatably mounted about an associated axis of rotation $5C_1$, . . . , $5C_7$. In the shown embodiment, the rotation axes $5C_1$, . . . , $5C_7$ point to the geometric center G of the aircraft and the heptagon, respectively. This embodiment is intended to describe the general case where (an odd number of) n=2j+1, j>1, propulsion devices $1C_1$, . . . , $1C_{2j+1}$ are arranged around the aircraft fuselage 220 such that they form the vertices of a regular polygon with (2j+1) edges. The associated rotation axes $5C_1$, . . . , $5C_{2j+1}$ should point towards (or away from) the geometrical center G. In this case, it is convenient to consider a first straight line $g_1$ such that passes through two propulsion devices $1C_1$ and $1C_{(n+1)/2}$; this straight line $g_1$ defines the first direction according to the invention. Further, it is convenient to consider a second straight line $g_2$ passing through two propulsion devices $1C_k$ and $1C_{k+(n-1)/2}$, $k=1+\lceil (n-1)/4 \rceil$ (where $\lceil \ \rceil$ rounding up its argument to the nearest integer); this straight line $g_2$ defines the second direction according to the invention.

With the aid of simple geometric considerations, it is obtained that each of the rotary axes $5C_1$ and $5C_{(n+1)/2}$ encloses with the straight line $g_1$ (i.e. the first direction) an angle $\alpha_1 = \alpha_{(n+1)/2} = 90°/n$; the same applies to the angles between the axes of rotation $5C_k$ and $5C_{k+(n-1)/2}$ and the straight line $g_2$: $\alpha_k = \alpha_{k+(n-1)/2} = 90°/n$. In the case of the shown heptagon there are thus $\alpha_1 = \alpha_3 = a_4 = \alpha_6 = 90°/7 \approx 12.86°$. For a regular polygon with (2j+1) edges, it is therefore advantageous if the axes of rotation of the propulsion devices, which lie on the straight lines $g_1$ and $g_2$ defining the first and second directions, respectively, enclose an angle between 0° and 90°/n with the associated straight lines $g_1$ and $g_2$, respectively.

The angle ε between $g_1$ and $g_2$ is given by $$\varepsilon = 90° \cdot \left(1 - \frac{1}{n}\right)$$

as one can easily think about by using geometric relations.

FIG. 9c shows an aircraft according to the second aspect of the invention, wherein six propulsion devices $1C_1$, . . . , $1C_6$ are arranged in a plane around the aircraft fuselage 220. The propulsion devices $1C_1$, . . . , $1C_6$ are arranged to form the vertices of a regular hexagon. Each of the propulsion devices is rotatably mounted about an associated axis of rotation $5C_1$, . . . , $5C_6$. In the shown embodiment, the rotation axes $5C_1$, . . . , $5C_6$ point to the geometric center G of the aircraft and the hexagon, respectively. This example is intended to describe the general case where (an even number of) n=2j, j>1, propulsion devices $1C_1$, . . . , $1C_{2j}$ are arranged around the aircraft fuselage 220 in such a way that they form the vertices of a regular polygon with 2j edges. The aircraft fuselage 220 is located between each two opposing propulsion devices of the regular polygon with 2j edges. The associated rotation axes $5C_1$, . . . , $5C_{2j}$ are intended to point towards (or away from) the geometric center G. In this case, it is convenient to consider a first straight line $g_1$ such that passes through two propulsion devices $1C_1$ and $1C_{n/2+1}$; this straight line $g_1$ defines the first direction according to the invention. Further, it is convenient to consider a second straight line $g_2$ passing through two propulsion devices $1C_k$ and $1C_{k+n/2}$, $k=1+\lceil n/4 \rceil$; this straight line $g_2$ defines the second direction according to the invention.

In the embodiment shown, rotary axes of the propulsion devices arranged on the straight lines $g_1$ and $g_2$ are aligned (mathematically exactly) parallel in the first and second directions, respectively.

Particularly preferably, the first and second directions are substantially perpendicular, specifically: perpendicular, to each other; this is possible whenever the propulsion devices form the vertices of a polygon with 4j edges.

The angle ε between $g_1$ and $g_2$ (i.e., first and second directions) for the 2j vertices described above is given by $$\varepsilon = 90° \cdot \left(1 - \frac{1}{n} \cdot (n \bmod 4)\right),$$

as can be easily reasoned by using geometric relations.

From the above embodiments it can be seen that, for the arrangement of any number (even or odd) of propulsion devices at the vertices of a regular polygon with n edges, it is sufficient if the axes of rotation of the propulsion devices, which lie on the straight lines $g_1$ and $g_2$ defining the first and second directions, respectively, form an angle with the corresponding straight lines $g_1$ and $g_2$ make an angle of between 0° and 30° (for n>2), particularly preferably between 0° and 18° (for n>3); furthermore, it is convenient if the straight lines $g_1$ and $g_2$ (and thus the first and second directions) are chosen so that the angle between them is greater than or equal to 60°, particularly in the range between 60° and 90°.

APPENDIX (DERIVATION OF THE RELATIONSHIP BETWEEN THRUST AND POWER)

The derivation of the thrust and power is based on the momentum theory, whereby a propulsion device/rotor is considered as an actuator disk without information about the number and shape of the rotor blades. The flow is defined simplistically as one-dimensional, quasi-stationary, incompressible and frictionless, resulting in the corresponding conservation laws for mass, momentum and energy. In the following, all quantities in the actuator disk plane are given the additional index a, all quantities far above the actuator disk plane (inflow plane) with the additional index 0 and all quantities far below the actuator disk plane (outflow plane) with the additional index ∞ marked.

Law of Conservation of Mass:

Due to the assumptions regarding the flow, the mass flow follows from the law of conservation of mass:

$$\dot{m} = \rho * A_n * (v_0 + v_{in}) = \text{constant} \quad n = 0, \ldots, a, \ldots, \infty$$

$\dot{m}$ . . . mass flow
$\rho$ . . . density
A . . . area
$v_0$ . . . inflow velocity
$v_i$ . . . induced velocity Conservation of Momentum:

Due to the assumptions regarding the flow, the thrust force follows from the law of conservation of momentum:

$$F = \dot{p} = \dot{m} * \Delta V = \dot{m} * ((v_0 + v_{i\infty}) - (v_0 + v_{i0}))$$

F . . . thrust
$\dot{p}$ . . . change of momentum

Since the rotor does not influence the inflow plane, the following applies $v_{i0}=0$ from which $$F = \dot{m} * v_{i\infty}$$

follows. Inserting the mass flow in the actuator disk plane gives:

$$F = \rho * A_a * (v_0 + v_{ia}) * v_{i\infty}$$

Law of Conservation of Energy:

Due to the assumptions regarding the flow and $v_{i0}=0$ the power or work done per unit time for the actuator disk plane follows from the law of conservation of energy:

$$P = F * (v_0 + v_{ia}) = \Delta E_{kin} = \frac{\dot{m} * ((v_0 + v_{i\infty})^2 - v_0^2)}{2} = \frac{\dot{m} * v_{i\infty} * (2 * v_0 + v_{i\infty})}{2}$$

P . . . power

By inserting the mass flow in the actuator disk plane, it follows:

$$P = \frac{\rho * A_a * (v_0 + v_{ia}) * v_{i\infty} * (2 * v_0 + v_{i\infty})}{2}$$

Using the thrust force, the power results to:

$$P = \frac{F * (2 * v_0 + v_{i\infty})}{2} = F * \left(v_0 + \frac{v_{i\infty}}{2}\right)$$

From these equations directly results the relation $$v_{ia} = \frac{v_{i\infty}}{2},$$

whereby the performance as $$P = F * (v_0 + v_{ia}) = F * V_a$$

$V_a$ . . . total flow velocity
can be expressed.

LIST OF REFERENCE SIGNS

100 Aircraft according to the first aspect of the invention.
120 Aircraft body
1F Propulsion devices arranged in the front area
1R Propulsion devices arranged in the rear area
101 Longitudinal direction of the aircraft 100
102 Transverse direction of the aircraft 100
103 Vertical direction of the aircraft 100
121 Bow/nose of the aircraft 100
122 Tail of the aircraft 100
1 Propulsion device
2 Rotor blades of a propulsion device
3 Pitch mechanism
31 Coupling device
32 Coupling point
33 Bearing device
4 Offset device
11 Disk of a the propulsion device 1
5 Rotational axis of a propulsion device
51 Direction of rotation of a propulsion device
52 Radius of the propulsion device
61 Connecting element
7, 71 Force on a propulsion device/thrust vector
72 Contribution of the Magnus effect to the thrust vector
8 Torque on a propulsion device
9 Air inflow
110 Arrow indicating the direction of movement of the aircraft
150 Center of mass of the aircraft 100
701 Total thrust vector generated by the propulsion devices 1F
702 Total thrust vector generated by the propulsion devices 1R
81 Total torque generated by the propulsion devices 1F
82 Total torque generated by the propulsion devices 1R
131 Distance with respect to longitudinal direction between center of mass 150 and propulsion devices 1F
132 Distance with respect to the longitudinal direction between center of mass 150 and propulsion devices 1R
160 Weight of the aircraft
$g_i$ i-th straight line along which propulsion devices are arranged
$n_i$ Number of propulsion devices arranged along the straight line $g_i$
N Total number of straight lines
K Total number of propulsion devices
$F_{ij}$ Thrust vector generated by the j-th propulsion device arranged on the straight line $g_i$
$F_i$ Thrust vector generated by all propulsion devices arranged on a straight line $g_i$
$M_i$ Torque generated by all propulsion devices arranged on a straight line $g_i$
$x_i$ Longitudinal coordinate of the line $g_i$
$X_s$ Longitudinal coordinate of the center of mass 150
200 Aircraft according to the second aspect of the invention
220 Aircraft fuselage
1A, 1B, 1C, $1A_1$, $1A_2$, $1B_3$, $1B_4$, $1C_i$ aircraft propulsion devices 200

221, 222 Arms for coupling the propulsion devices 1A, 1B to the aircraft fuselage 220
201 First direction
202 Second direction
203 Vertical direction
5A Rotational axes of the propulsion devices 1A
5B Rotational axes of the propulsion devices 1B
$5C_i$ Rotational axis of the propulsion device $1C_i$
$\alpha_i$ Angle between rotation axis $5C_i$ and first or second direction
$\varepsilon$ Angle between first and second direction
250 Center of mass of the aircraft 200
G geometric center
O Origin of the coordinate system
2001, 2002 Thrust vectors generated by the propulsion devices $1A_1$ and $1A_2$, respectively
2003, 2004 Thrust vectors generated by propulsion devices $1B_3$ and $1B_4$, respectively
2012 Total thrust vector generated by propulsion devices $1A_1$, $1A_2$
2034 Total thrust vector generated by propulsion devices $1B_3$, $1B_4$
230 Distance between the thrust vectors/geometric centers of the propulsion devices $1A_1$, $1A_2$
231 Distance of thrust vector 2001 from center of mass 250 of aircraft
232 Distance of thrust vector 2002 from center of mass 250 of aircraft
234 Distance between the center of mass 250 and the thrust vector $F_{34}$, 2034/the axes of rotation of the propulsion devices $1B_3$, $1B_4$/the straight line passing through the propulsion devices $1B_3$, $1B_4$
235 Distance between thrust vectors/geometric centers of propulsion devices $1B_3$, $1B_4$
236 Distance of thrust vector 2003 from center of mass 250 of aircraft
237 Distance of thrust vector 2004 from center of mass 250 of aircraft
239 Distance between the center of mass 250 and the thrust vector $F_{12}$, 2012/the axes of rotation of the propulsion devices $1A_1$, $1A_2$/the straight line passing through the propulsion devices $1A_1$, $1A_2$
251 Direction of rotation of propulsion devices $1B_3$, $1B_4$
280 Total torque generated by the propulsion devices $1B_3$, $1B_4$
285 total torque generated by the propulsion devices $1A_1$, $1A_2$

The invention claimed is:

1. An aircraft comprising:
an aircraft body defining a longitudinal direction, a vertical direction, and a transverse direction, the longitudinal direction corresponding to the direction from a tail to a nose of the aircraft, the vertical direction corresponding to the direction of the earth's gravitational force when the aircraft is resting on the ground, and the transverse direction being perpendicular to the longitudinal direction and the vertical direction; and
at least two propulsion devices, each rotatable about an associated axis of rotation to generate a respective associated thrust vector, the respective associated thrust vector being rotatable in the entire plane perpendicular to the associated axis of rotation of the at least two propulsion devices, wherein:
a first number of the propulsion devices is arranged along a first straight line parallel to the transverse direction, and a second number of the propulsion devices is arranged along a second straight line parallel to the transverse direction,
wherein the first number of the propulsion devices is arranged in a front region of the aircraft with respect to the longitudinal direction, and the second number of the propulsion devices is arranged in a rear region of the aircraft with respect to the longitudinal direction, wherein the second number of propulsion devices is arranged elevated with respect to the first number of propulsion devices;
the first straight line is spaced apart from the second straight line; and
a center of mass of the aircraft is positioned with respect to the longitudinal direction between the first straight line and the second straight line;
wherein the aircraft is adapted to perform a hover flight in which all forces acting on the aircraft and all torques acting on the aircraft with respect to the center of mass of the aircraft are in balance, characterized in that in the hover flight:
each of the associated axes of rotation is oriented substantially in the transverse direction of the aircraft body; and
each of the at least two propulsion devices rotates substantially in the same direction of rotation about the respective associated axis of rotation;
wherein the aircraft is further adapted to perform a forward flight in which the respective associated thrust vectors of the at least two propulsion devices are generated to include forward-flight- and lift-generating components; and
wherein the at least two propulsion devices are cyclogyro rotors.

2. The aircraft according to claim 1, wherein the center of mass of the aircraft, when performing hover flight, is positioned longitudinally at a distance $l_1$ from the straight line along which the propulsion devices (1F) are arranged in the front region, wherein:

$$l_{1_{min}} \le l_1 \le l_{1_{max}},$$

with $$l_{1_{min}} = \frac{a_1 + a_2}{2} + \frac{l}{R_{max} + 1} \text{ and } l_{1_{max}} = \frac{a_1 + a_2}{2} + \frac{l}{R_{min} + 1}$$

wherein
$R_{min}$ is a minimum permissible ratio between the thrust vectors of the propulsion devices arranged in the front region, on the one hand, and the thrust vectors of the propulsion devices arranged in the rear region, on the other hand,
$R_{max}$ is a maximum permissible ratio between the thrust vectors of the propulsion devices arranged in the front region, on the one hand, and the thrust vectors of the propulsion devices arranged in the rear region, on the other hand,
l is a distance between the first straight line and the second straight line,
$a_1$ is a characteristic number for the propulsion devices arranged in the front region, and
$a_2$ is a characteristic number for the propulsion devices located in the rear region.

3. The aircraft according to claim 1, wherein the propulsion devices comprise cyclogyro rotors.

4. The aircraft according to claim 1, further adapted such that, in hover flight, the center of mass of the aircraft is positioned such that thereby all forces acting on the aircraft and all torques acting on the aircraft with respect to the center of mass of the aircraft are caused to be in balance when one or more of the propulsion devices generate a respective particular predetermined thrust vector associated with the one or more of the propulsion devices.

5. The aircraft according claim 1 and further comprising:
a displacement device for displacing the center of mass of the aircraft;
a thrust vector control to individually control the thrust vectors of the propulsion devices; and
one of a fuel tank for supplying fuel to the propulsion devices and a battery for supplying electrical power to the propulsion devices,
wherein the displacement device is adapted to relocate fuel from the fuel tank or the battery within the aircraft to thereby position the center of mass such that the aircraft performs hover flight when one or more of the propulsion devices generates the respective particular predetermined thrust vector.

6. A method of balancing the aircraft according to claim 1, the method comprising:
positioning the center of mass of the aircraft to cause the aircraft to perform a hover flight in which all forces acting on the aircraft and all torques acting on the aircraft with respect to the center of mass of the aircraft are in balance when:
one or more of the propulsion devices generate a particular predetermined thrust vector associated with the one or more of the propulsion devices, respectively;
each of the associated axes of rotation is oriented substantially in the transverse direction of the aircraft body; and
each of the at least two propulsion devices rotates substantially in the same direction of rotation about the respective associated axis of rotation.

7. An aircraft comprising:
an aircraft fuselage; and
at least three propulsion devices mounted around the aircraft fuselage substantially in a plane and rotatable about a respective associated axis of rotation to generate a respective associated thrust vector,
wherein the aircraft is adapted to perform a hover flight in which all forces acting on the aircraft and all torques acting on the aircraft with respect to a center of mass of the aircraft are in balance, characterized in that in the hover flight:
the associated axes of rotation of two of the at least three propulsion devices are substantially aligned in a first direction, and the associated axis of rotation of another of the at least three propulsion devices is substantially aligned in a second direction, wherein:
the first direction is not parallel to the second direction,
the first direction and the second direction lie in the plane; and
each of the two propulsion devices with axes of rotation oriented in the first direction in hover flight rotates in substantially the same direction of rotation about the respective associated axis of rotation,
wherein the aircraft is further adapted to perform a forward flight in which the plane in which the first direction and the second direction lie is oriented horizontally relative to the ground, and
wherein the at least three propulsion devices are cyclogyro rotors.

8. The aircraft according to claim 7:
wherein at least four propulsion devices are mounted around the aircraft fuselage and are rotatable about a respective associated axis of rotation to generate a respective associated thrust vector,
wherein the aircraft is adapted to perform the hover flight, in that in the hover flight:
the associated axes of rotation of two of the at least four propulsion devices are substantially aligned in the first direction, and the associated axes of rotation of two further of the at least four propulsion devices are substantially aligned in the second direction (202);
each of the two propulsion devices with axes of rotation oriented in hover flight in the first direction rotates substantially in the same direction of rotation about the respectively associated axis of rotation; and
each of the two propulsion devices with axes of rotation oriented in hover flight in the second direction rotates substantially in the same direction of rotation about the respectively associated axis of rotation.

9. The aircraft according to claim 8, wherein the at least four propulsion devices are arranged around the aircraft fuselage in such a way that they form the vertices of a regular polygon with one edge corresponding to each of the at least four propulsion devices, wherein:
the aircraft fuselage is located in the geometric center of the regular polygon with one edge corresponding to each of the at least four propulsion devices;
the first direction is defined by a first straight line on which two of the at least four propulsion devices lie;
the second direction is defined by a second straight line on which two more of the at least four propulsion devices lie;
the axis of rotation of each of the two propulsion devices lying on the first straight line pointing in the first direction includes an angle with the first straight line which is in the range between 0° and 18°; and
the angle between the first straight line and the second straight line is in the range between 72° and 90°.

10. The aircraft according to claim 8, wherein:
the second direction is substantially perpendicular to the first direction, and
two of the at least four propulsion devices are arranged along the first direction, and the two other of the at least four propulsion devices are arranged along the second direction substantially perpendicular to the first direction.

11. The aircraft according to claim 10, wherein:
the center of mass of the aircraft, when performing hover flight, is positioned with respect to the first direction at a distance $l_{34}$ from a straight line along which the propulsion devices are arranged in the second direction, wherein:

$$l_{34_{min}} \leq l_{34} \leq l_{34_{max}},$$

with $$l_{34_{min}} = \frac{(R_{max} + 3)*l + (R_{max} + 1)*2*a_{34}}{(R_{max} + 1)*4} - \frac{l}{2}$$

and $$l_{34_{max}} = \frac{(R_{min} + 3)*l + (R_{min} + 1)*2*a_{34}}{(R_{min} + 1)*4} - \frac{l}{2},$$

wherein:
$R_{min}$ is a minimum permissible ratio between the thrust vectors of the propulsion devices arranged along the first direction:
$R_{max}$ is a maximum permissible ratio between the thrust vectors of the propulsion devices arranged along the first direction;
$a_{34}$ is a characteristic number for the propulsion devices arranged along the second direction (202), and
l is the distance between the geometric centers of the propulsion devices arranged in the first direction; and
the center of mass of the aircraft, when performing hover flight, is positioned with respect to the second direction at a distance $l_{12}$ from a straight line along which the propulsion devices are arranged in the first direction, wherein $$l_{12_{min}} \leq l_{12} \leq l_{12_{max}}, \text{ with}$$

$$l_{12_{min}} = \frac{(R'_{max} + 3)*l' + (R'_{max} + 1)*2*a_{12}}{(R'_{max} + 1)*4} - \frac{l'}{2}$$

and $$l_{12_{max}} = \frac{(R'_{min} + 3)*l' + (R'_{min} + 1)*2*a_{12}}{(R'_{min} + 1)*4} - \frac{l'}{2},$$

wherein:
$R_{min}'$ is a minimum permissible ratio between the thrust vectors of the propulsion devices arranged along the second direction;
$R_{max}'$ is a maximum permissible ratio between the thrust vectors of the propulsion devices arranged along the second direction;
$a_{12}$ is a characteristic number for the propulsion devices arranged along the first direction; and
i is the distance of the geometrical centers of the propulsion devices arranged in the second direction.

12. The aircraft according to claim 7, wherein the at least three propulsion devices are arranged around the aircraft fuselage such that they form the edges of an equilateral triangle, wherein:
the aircraft fuselage is located in the geometric center of the triangle;
the first direction is defined by a straight line on which two of the three propulsion devices lie;
the second direction is substantially perpendicular to the first direction; and
the axis of rotation of each of the two propulsion devices lying on the straight line pointing in the first direction includes an angle with the straight line which is in the range between 0° and 30°.

13. The aircraft according to claim 7, further adapted such that, in hover flight, the center of mass of the aircraft is positioned such that thereby all forces acting on the aircraft and all torques acting on the aircraft with respect to the center of mass of the aircraft are caused to be in balance when one or more of the propulsion devices generate a respective particular predetermined thrust vector associated with the one or more of the propulsion devices.

14. The aircraft according to claim 7, wherein the propulsion devices comprise cyclogyro rotors.

15. The aircraft according claim 7 and further comprising:
a displacement device for displacing the center of mass of the aircraft;
a thrust vector control to individually control the thrust vectors of the propulsion devices; and
one of a fuel tank for supplying fuel to the propulsion devices and a battery for supplying electrical power to the propulsion devices,
wherein the displacement device is adapted to relocate fuel from the fuel tank or the battery within the aircraft to thereby position the center of mass such that the aircraft performs hover flight when one or more of the propulsion devices generates the respective particular predetermined thrust vector.

16. A method of balancing the aircraft according to claim 7, the method comprising:
positioning the center of mass of the aircraft to cause the aircraft to perform a hover flight in which all forces acting on the aircraft and all torques acting on the aircraft with respect to the center of mass of the aircraft are in balance when:
one or more of the propulsion devices generate a particular predetermined thrust vector associated with the one or more of the propulsion devices, respectively;
the associated axes of rotation of two of the at least three propulsion devices are aligned substantially in the first direction, and the associated axis of rotation of another of the at least three propulsion devices is aligned substantially in the second direction; and
each of the two propulsion devices with axes of rotation oriented in the first direction in hover flight rotates in substantially the same direction of rotation about the respective associated axis of rotation.

17. A method for controlling an aircraft having:
an aircraft body defining a longitudinal direction, a vertical direction, and a transverse direction, the longitudinal direction corresponding to the direction from a tail to a nose of the aircraft, the vertical direction corresponding to the direction of the earth's gravitational force when the aircraft is resting on the ground, and the transverse direction being perpendicular to the longitudinal direction and the vertical direction; and
at least two propulsion devices rotatable about a respective associated axis of rotation to generate a respective associated thrust vector, the respective associated thrust vector being rotatable in the entire plane perpendicular to the respective associated axis of rotation of the at least two propulsion devices, wherein:
a first number of the propulsion devices is arranged along a first straight line parallel to the transverse direction, and a second number of the propulsion devices is arranged along a second straight line parallel to the transverse direction,
wherein the first number of the propulsion devices is arranged in a front region of the aircraft with respect to the longitudinal direction, and the second number of the propulsion devices is arranged in a rear region of the aircraft with respect to the longitudinal direction;

wherein the second number of propulsion devices is arranged elevated with respect to the first number of propulsion devices;

the first straight line is spaced apart from the second straight line; and a center of mass of the aircraft is positioned with respect to the longitudinal direction between the first straight line and the second straight line, wherein the aircraft is further adapted to perform a hover flight in which all forces acting on the aircraft and all torques acting on the aircraft with respect to the center of mass of the aircraft are in balance, wherein the aircraft is further adapted to perform a forward flight in which the associated thrust vectors of the at least two propulsion devices are generated to include forward-flight- and lift-generating components, and wherein the at least two propulsion devices are cyclogyro rotors;

the method comprising the following steps:

determining the associated thrust vectors such that the aircraft performs a hover flight when each of the axes of rotation associated with the at least two propulsion devices is oriented substantially in the transverse direction of the aircraft body, and each of the at least two propulsion devices rotates substantially in the same direction of rotation about the respective associated axis of rotation, wherein in hover flight all forces acting on the aircraft and all torques acting on the aircraft with respect to the center of mass of the aircraft are in balance; and driving each of the propulsion devices in substantially the same direction of rotation such that the respective propulsion device generates the particular associated thrust vector.

18. The method according to claim 17, further comprising the step of:

positioning the center of mass of the aircraft to cause the aircraft to perform the hover flight when all forces acting on the aircraft and all torques acting on the aircraft with respect to the center of mass of the aircraft are in balance when the propulsion devices generate the particular predetermined thrust vector associated with the propulsion devices.

19. A method for controlling an aircraft having:

an aircraft fuselage; and at least three propulsion devices mounted around the aircraft fuselage substantially in a plane and rotatable about a respective associated axis of rotation to generate a respective associated thrust vector;

the method comprising the following steps:

determining the associated thrust vectors such that the aircraft performs a hover flight when two of the rotational axes associated with the at least three propulsion devices are substantially aligned in a first direction and rotate in the same selected rotational direction about the respective associated rotational axis, and/or another of the rotational axes associated with the at least three propulsion devices is substantially aligned in a second direction that is not parallel to the first direction, wherein in hover flight all forces acting on the aircraft and all torques acting on the aircraft with respect to the center of mass of the aircraft are in balance;

aligning the associated axes of rotation of two of the at least three propulsion devices substantially in the first direction, and aligning the associated axis of rotation of the one other of the at least three propulsion devices substantially in the second direction, wherein the first direction is not parallel to the second direction and the first direction and the second direction lie in a plane; and driving each of the propulsion devices such that the respective propulsion device rotates in the selected rotational direction and generates the particular associated thrust vector;

wherein the aircraft is further adapted to perform a forward flight in which the plane in which the first direction and the second direction lie is oriented horizontally relative to the ground, and wherein the at least three propulsion devices are cyclogyro rotors.

* * * * *